(12) United States Patent
Choi

(10) Patent No.: US 10,599,219 B2
(45) Date of Patent: Mar. 24, 2020

(54) METHOD OF PROVIDING A HAPTIC EFFECT AND ELECTRONIC DEVICE SUPPORTING THE SAME

(71) Applicant: SAMSUNG ELECTRONICS CO., LTD., Suwon-si, Gyeonggi-do (KR)

(72) Inventor: Hyunsuk Choi, Daegu (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 71 days.

(21) Appl. No.: 15/338,606

(22) Filed: Oct. 31, 2016

(65) Prior Publication Data
US 2017/0131772 A1    May 11, 2017

(30) Foreign Application Priority Data
Nov. 6, 2015    (KR) .................. 10-2015-0155594

(51) Int. Cl.
| G06F 3/041 | (2006.01) |
| G06F 3/01 | (2006.01) |
| G06F 3/0488 | (2013.01) |
| G06F 1/16 | (2006.01) |
| G04G 21/08 | (2010.01) |

(52) U.S. Cl.
CPC ............ *G06F 3/016* (2013.01); *G04G 21/08* (2013.01); *G06F 1/1601* (2013.01); *G06F 1/163* (2013.01); *G06F 1/1626* (2013.01); *G06F 1/1684* (2013.01); *G06F 3/011* (2013.01); *G06F 3/014* (2013.01); *G06F 3/017* (2013.01); *G06F 3/041* (2013.01); *G06F 3/04883* (2013.01)

(58) Field of Classification Search
CPC ..... G04G 21/08; G06F 1/1601; G06F 1/1626; G06F 1/163; G06F 1/1684; G06F 3/011; G06F 3/014; G06F 3/016; G06F 3/017; G06F 3/04883
See application file for complete search history.

(56) References Cited

U.S. PATENT DOCUMENTS

| 2004/0146844 | A1* | 7/2004 | Marcus ................ G09B 1/06 434/307 R |
| 2006/0109256 | A1* | 5/2006 | Grant ................... G06F 3/016 345/173 |
| 2011/0055774 | A1* | 3/2011 | Kim ..................... G06F 3/017 715/863 |
| 2012/0268412 | A1* | 10/2012 | Cruz-Hernandez ............... G06F 3/0488 345/174 |
| 2013/0016042 | A1* | 1/2013 | Makinen ............... G06F 3/016 345/168 |

(Continued)

FOREIGN PATENT DOCUMENTS

| KR | 10-2006-0008006 | 1/2006 |
| KR | 10-2007-0081986 | 8/2007 |

(Continued)

*Primary Examiner* — Temesghen Ghebretinsae
*Assistant Examiner* — Sosina Abebe
(74) *Attorney, Agent, or Firm* — Nixon & Vanderhye, P.C.

(57) ABSTRACT

Disclosed is a method of providing a haptic effect and an electronic device for supporting the same. The method according to various embodiments includes detecting a first input, determining a haptic object or texture corresponding to the first input in response to the first input, and providing a haptic feedback based on the determined texture at a location where the first input is detected.

18 Claims, 19 Drawing Sheets

(56) References Cited

U.S. PATENT DOCUMENTS

| | | | |
|---|---|---|---|
| 2014/0145970 A1* | 5/2014 | Cho | G06F 3/016 |
| | | | 345/173 |
| 2014/0380187 A1* | 12/2014 | Gardenfors | G06F 3/017 |
| | | | 715/748 |
| 2015/0054728 A1* | 2/2015 | Choi | G06F 3/015 |
| | | | 345/156 |
| 2015/0103015 A1* | 4/2015 | Berglund | G06F 3/016 |
| | | | 345/173 |
| 2015/0378598 A1* | 12/2015 | Takeshi | G06F 3/04886 |
| | | | 715/773 |
| 2017/0228028 A1* | 8/2017 | Nakamura | G06F 3/017 |

FOREIGN PATENT DOCUMENTS

| | | |
|---|---|---|
| KR | 10-2008-0108651 | 12/2008 |
| KR | 10-2009-0095295 | 9/2009 |

* cited by examiner

<241>  <251>

<261>

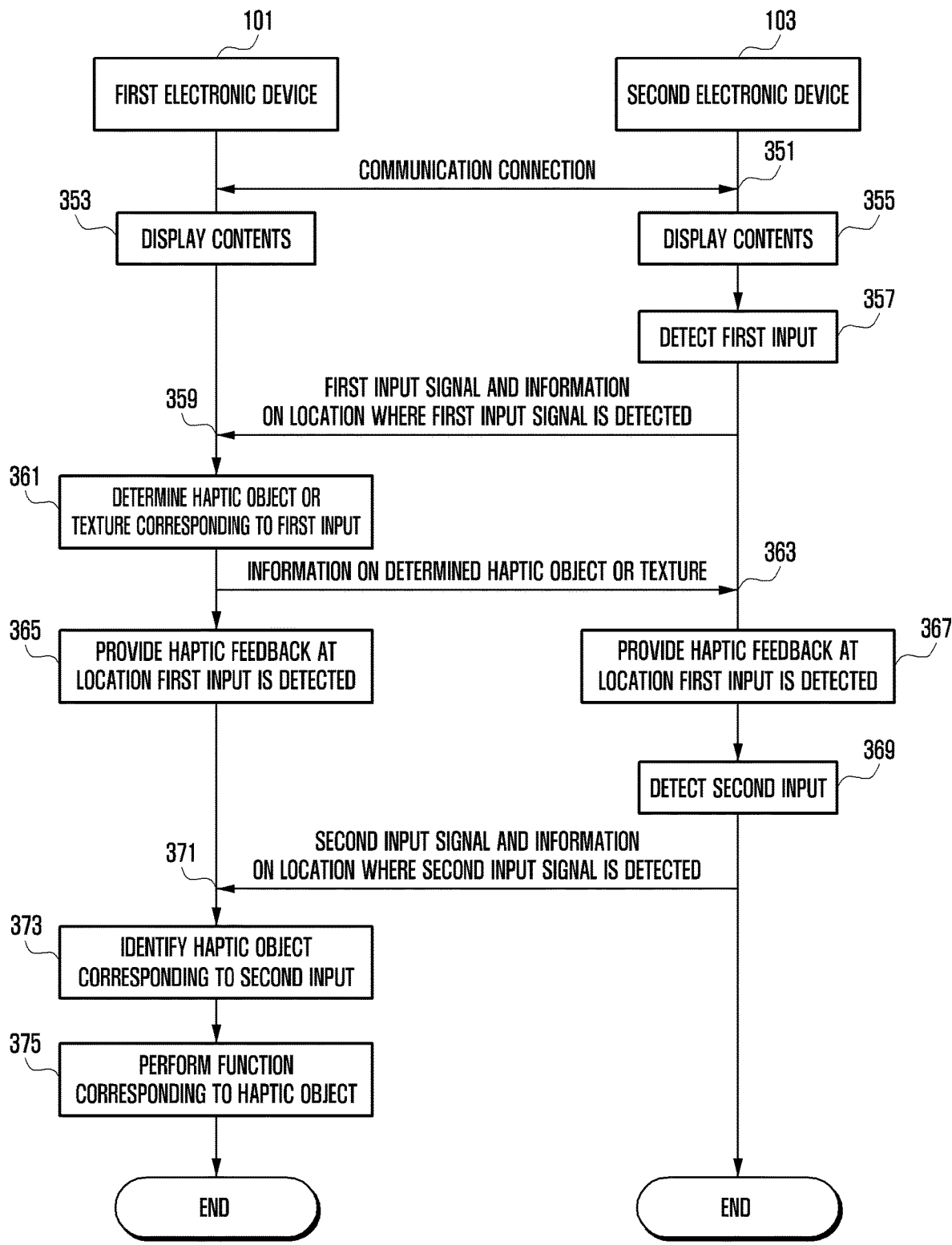

<400>

<410>

<420>

<430>

<810>

<820>

<830>

<840>

<850>

<860>

<951>

<953>

<955>

<957>

<961>

<963>

<965>

<967>

<1040>

<1050>

<1060>

METHOD OF PROVIDING A HAPTIC EFFECT AND ELECTRONIC DEVICE SUPPORTING THE SAME

CROSS-REFERENCE TO RELATED APPLICATION

This application is based on and claims priority under 35 U.S.C. § 119 to Korean Patent Application No. 10-2015-0155594, filed on Nov. 6, 2015, the disclosure of which is incorporated by reference herein in its entirety.

BACKGROUND

1. Field

Various embodiments of the disclosure generally relate to a method of providing a haptic effect and to an electronic device supporting the same.

2. Description of Prior Art

Electronic devices may generate a visual effect, auditory effect, and tactile effect to signal a specific event to a user. Especially, the user may operate functions relating to a content displayed on a touch screen of the electronic device. The electronic device may generate a tactile effect (for example, a vibration effect) with respect to the user's content operation. Accordingly, the user can feel a real feedback regarding the content operation.

However, an object relating to the above-described content operation generates only a predetermined vibration effect in a predetermined location, and does not flexibly generate the tactile effect in a region where the user wants to.

SUMMARY

A method of providing a haptic effect and an electronic device for supporting the same according to various example embodiments of the present disclosure may provide an electronic device and method for providing an optimized and/or improved and differentiated haptic feedback to the user on the basis of various gestures and locations where the gestures are detected.

The method of providing a haptic effect and an electronic device for supporting the same according to various example embodiments of the present disclosure may output a haptic feedback to which a texture is applied at a location where a gesture is detected. In addition, in various example embodiments of the present disclosure, an electronic device provides a haptic feedback based on the texture. Therefore, the user can distinguish functions of a haptic object even in an electronic device which does not have a display.

In accordance with an example aspect of the disclosure, an electronic device is provided. The electronic device includes: a touch panel configured to detect an input; a haptic module including haptic circuitry configured to provide a haptic feedback; and a processor configured to, when a first input is detected through the touch panel, determine a haptic object or texture corresponding to the first input, and to control the haptic circuitry to provide a haptic feedback based on the determined texture at a location where the first input is detected.

In accordance with another example aspect of the disclosure, a method of providing a haptic effect is provided. The method includes: detecting a first input; determining a haptic object or texture corresponding to the first input in response to the first input; and providing a haptic feedback based on the determined texture at a location where the first input is detected.

The method of providing a haptic effect and an electronic device for supporting the same according to various example embodiments of the present disclosure provides an optimized and/or improved haptic feedback to the user, and thereby maximizing and/or improving the haptic experience. Also, the electronic device provides haptic objects of different textures. Therefore, the user can distinguish the haptic objects through the haptic feedback based on the textures even in an electronic device which does not have a display.

The method of providing a haptic effect and an electronic device for supporting the same according to various example embodiments of the disclosure allows the user to generate a haptic object in a region desired by the user. Therefore, the user can easily operate the electronic device. In addition, the user can identify the haptic object through the haptic feedback based on the texture without seeing the electronic device, and can perform functions of the electronic device.

BRIEF DESCRIPTION OF THE DRAWINGS

The above and other objects, features and advantages of the disclosure will be more apparent from the following detailed description, taken in conjunction with the accompanying drawings, in which like reference numerals refer to like elements, and wherein:

FIGS. 3A, 3B and 3C are flowcharts illustrating example methods of providing a haptic effect according to various example embodiments.

DETAILED DESCRIPTION

Figure 1:
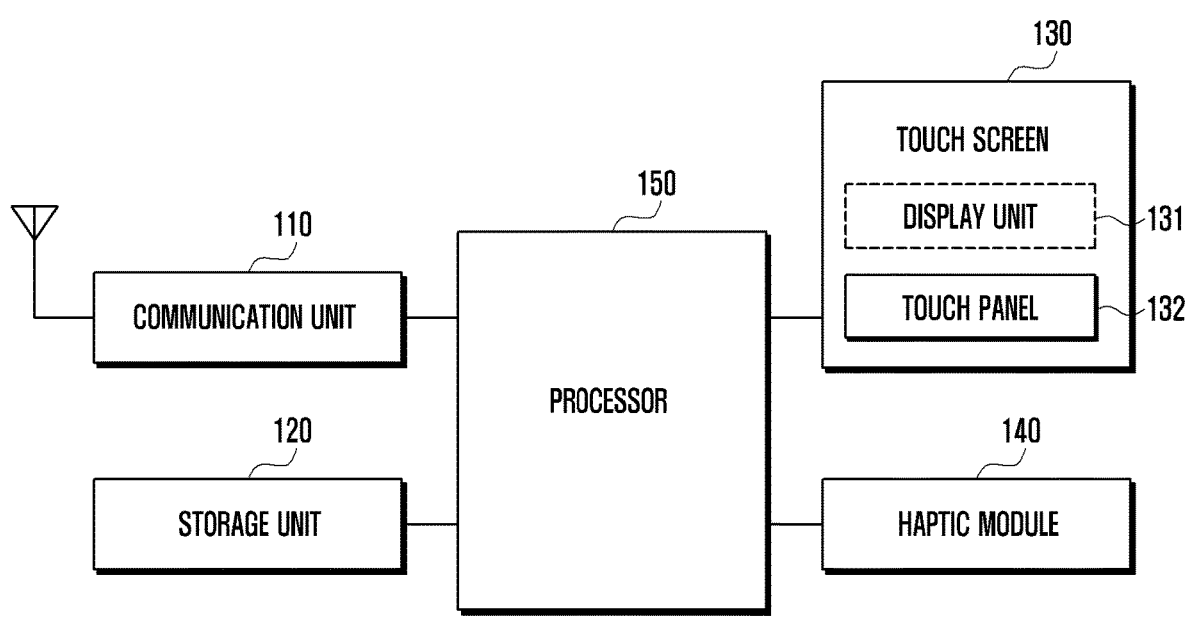
FIG. 1 is a block diagram illustrating an example configuration of an electronic device according to various example embodiments.

Hereinafter, the present disclosure is described with reference to the accompanying drawings. Although various example embodiments are illustrated in the drawings and related detailed descriptions are discussed in the disclosure, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

In various embodiments of the present disclosure, the terms such as "include", "have", "may include" or "may have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "(operatively or communicatively) coupled to" or "connected to" another component, the component may be directly coupled or connected to another component or a new component may exist between the component and another component. In contrast, when it is stated that a component is "directly coupled to" or "directly connected to" another component, a new component does not exist between the component and another component. In the present disclosure, the expression "configured (or set) to do" may be used to be interchangeable with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor (e.g., CPU or application processor or any other processing circuitry) that may execute one or more software programs stored in a memory device to perform corresponding functions.

According to various embodiments, examples of the electronic device may include a smartphone, a tablet Personal Computer (PC), a mobile phone, a video phone, an electronic book reader, a desktop PC, a laptop PC, a netbook computer, a workstation, a server, a Personal Digital Assistant (PDA), a Portable Multimedia Player (PMP), an MP3 player, a medical device, a camera, and a wearable device. Examples of the wearable device may include an accessory type device (such as, watch, ring, bracelet, ankle bracelet, necklace, glasses, contact lens, and Head-Mount Device (HMD)), a textile or clothes type device (such as electronic clothes), a body-attached type (such as skin pad and tattoo), and a bio-implemented type. According to an embodiment, examples of the electronic device may include a television, a Digital Video Disc (DVD) player, an audio player, a refrigerator, an air conditioner, a cleaner, an oven, a microwave oven, a laundry machine, an air purifier, a set-top box, a home automation control panel, a security control panel, a media box (such as Samsung HomeSync™, apple TV™, and google TV™), a game console (such as Xbox™ and PlayStation™), an electronic dictionary, an electronic key, a camcorder, and an electronic frame, or the like, but is not limited thereto.

According to an embodiment, examples of the electronic device may include a medical device (such as portable medical sensors (including glucometer, heart rate sensor, tonometer, and body thermometer), Magnetic Resonance Angiography (MRA) device, Magnetic Resonance Imaging (MRI) device, Computed Tomography (CT) device, camcorder, and microwave scanner), a navigation device, a Global navigation Satellite System (GNSS), an Event Data Recorder (EDR), a Flight Data Recorder (FDR), an automotive infotainment device, marine electronic equipment (such as marine navigation system and gyro compass), aviation electronics (avionics), an automotive head unit, an industrial or household robot, an Automatic Teller Machine (ATM), a Point Of Sales (POS) terminal, and an Internet-of-Things (IoT) device (such as electric bulb, sensor, sprinkler system, fire alarm system, temperature controller, street lamp, toaster, fitness equipment, hot water tank, heater, and boiler), or the like, but is not limited thereto.

According to an embodiment, examples of the electronic device may include furniture, a building/structure, a part of a vehicle, an electronic board, an electronic signature receiving device, a projector, and a sensor (such as water, electricity, gas, and electric wave meters), or the like, but is not limited thereto. According to various embodiments, the electronic device may be flexible or a combination of at least two of the aforementioned devices. According to an embodiment, the electronic device is not limited to the aforementioned devices.

In the disclosure, the term "user" may denote a person who uses the electronic device or a device (e.g., artificial intelligent electronic device) which uses the electronic device. FIG. 1 is a view illustrating a configuration of an electronic device according to various embodiments.

Referring to FIG. 1, the electronic device according to an embodiment may include a communication unit (e.g., including communication circuitry) 110, a storage unit 120, a touch screen 130, a haptic module (e.g., including haptic circuitry) 140, and a processor (e.g., including processing circuitry) 150.

The communication unit 110 may use various communication circuitry to connect and provide a communication between the electronic device and an external electronic device. For example, the communication unit 110 may be connected to a network through communication circuitry configured for a wireless communication or a wired communication, and may communicate with the external electronic device. The wireless communication may include, various communication methods implemented by various communication circuitry, such as, for example, and without limitation, a wireless fidelity (WiFi), a bluetooth (BT), a near filed communication (NFC), or the like. Also, the wireless communication may include at least one of cellular communications (for example, LTE, LTE-A, CDMA, WCDMA, UMTS, WIBRO, GSM, or the like). The wired communication may include, for example, at least one of a universal serial bus (USB), a high definition multimedia interface (HDMI), a recommended standard 232 (RS-232), and a plain old telephone service (POTS).

In various embodiments, the communication unit 110 may use various communication circuitry to connect and provide a communication between the electronic device and an external electronic device (for example, a smart watch, a band type electronic device, a ring type electronic device, a patch type electronic device). The communication unit 110 may use various communication circuitry to receive a signal selecting a haptic object from the external electronic device connected through the communication unit 110. The communication unit 110 may use various communication circuitry to transfer the signal received from the external electronic device to the processor 150.

The storage unit 120 may include a program memory storing an operation program of the electronic device, and a data memory storing data, such as log information, contents, or the like, that are generated while performing a program.

In various embodiments, the storage unit 120 may store programs relating to a first input (for example, a first gesture) for providing a haptic feedback. The storage unit 120 may store a table in which the first gesture and a haptic object or a texture corresponding to the first gesture are mapped. The storage unit 120 may store a table in which functions of the electronic device which correspond to a second input (for example, a second gesture) are mapped. The storage unit 120 may store a table in which the haptic object and functions of the electronic device are mapped.

The touch screen 130 may be configured in an integral body type including a display unit 131 and a touch panel 132. The display unit 131 may display a variety of images in accordance with the use of the electronic device. Also, the display unit 131 may include a liquid crystal display (LCD), a light emitting display (LED), an organic LED (OLED), a microelectromechanical system (MEMS) display, or an electronic paper display. The display unit 131 may display a kind of content (for example, text, image, video, icon, or symbol) to the user.

The touch panel 132 may receive, for example, a touch, a gesture, a close, or a hovering input using an electronic pen or a part of a user's body.

In various embodiments, the display unit 131 may be, or may not be, provided in the electronic device. For example, in case that the electronic device is a smart phone or a smart watch, the display unit 131 including a display is provided, but in case that the electronic device is a band type electronic device or a ring type electronic device, the display unit 131 may not be provided.

The touch panel 132 may detect a first input for providing a haptic feedback (for example, a first gesture), and may transfer a detected signal to the processor 150.

In case that the electronic device includes the display 131, when the electronic device detects the first input for providing a haptic (for example, the first gesture) through the touch panel 132, the display unit 131 may display a haptic object to which a texture corresponding to the first gesture is applied, under control of the processor 150.

The touch panel 132 may detect a second input selecting the haptic object (for example, a second gesture), and may transfer a detected signal to the processor 150.

The display unit 131 may use a display to display an image according to a function operation of the electronic device which corresponds to the selected haptic object under control of the processor 150.

The haptic module 140 may use various haptic circuitry and processes generate a variety of tactile effects that the user can feel. The tactile effects generated by the haptic module 140 may include a vibration effect, an effect due to stimulation by an arrangement of a pin that moves vertically to a contact skin surface, an effect due to stimulation by rubbing the skin surface, an effect due to stimulation through a contact of an electrode, and an effect due to stimulation using an electrostatic force. In case that the haptic module 140 generates a vibration as a tactile effect, an intensity, pattern, or the like of the vibration generated by the haptic module 140 may be changed, and the haptic module 140 may synthesize different vibrations to output or sequentially output the vibrations. The haptic module 140 may be implemented not only to transfer the tactile effect through a direct contact, but also to allow the user to feel the tactile effect through a muscle sensation, such as the user's finger or arm.

The haptic module 140 may include various haptic circuitry, such as, for example, and without limitation, at least one vibration motor, at least one ultrasonic motor, at least one piezoelectric actuator, or at least one linear resonant actuator (LRA).

The processor 150 may include various processing circuitry (e.g., a CPU, application circuitry, or the like) to control the overall operations of the electronic device and a signal flow between the electronic device and the internal elements of the electronic device, perform a data processing, and control a power supply from a battery to the elements.

In various embodiments, the processor 150 may detect a first input for providing a haptic feedback, for example, a first gesture (for example, a gesture drawing a specific pattern). The processor 150 may determine a haptic object or texture corresponding to the first gesture, and may provide a haptic feedback to a location where the first gesture is detected. In various embodiments, the processor 150 may determine the haptic object or texture on the basis of at least one of a movement distance of the first gesture and the position where the first gesture is detected. In various embodiments, in case that the electronic device includes the display unit 131, the processor 150 may apply the texture to the haptic object corresponding to the first gesture to output on the display unit 131.

In various embodiments, the processor 150 may detect a second input for selecting the haptic object, for example, a second gesture. When the second gesture is detected, the processor 150 may identify a haptic object of a location where the second gesture is detected, and may perform a function corresponding to the identified haptic object.

In various embodiments, when a second input is detected in a haptic object having a toggle function (for example, on/off, play/stop, and start/stop), the processor 150 may change the haptic object or texture to output. For example, in case of a haptic object relating to an audio play, when the second input is detected in the audio play haptic object, the processor 150 may change the audio play haptic object into an audio stop haptic object to output.

In various embodiments, when an input for activating a haptic feedback (for example, a double tap), the processor 150 may determine whether a first input is detected. If the input for activating the haptic feedback and the first input are detected, the processor 150 may determine a haptic object or texture corresponding to the first input, and may provide the haptic feedback to a location where the first input is detected.

In various embodiments, when the input for activating the haptic feedback (for example, a double tap) is detected, the processor 150 may determine whether a second input is detected. If the input for activating the haptic feedback and the second input are detected, the processor 150 may identify the haptic object of a location where the second input is detected, and may perform a function corresponding to the identified haptic object.

In various embodiments, the processor 150 may communicate with an external electronic device through the communication circuitry of the communication unit 110. The processor 150 may receive a first input signal and information on a location where the first input signal is detected from the external electronic device through the communication unit 110. The processor 150 may determine a haptic object or texture corresponding to the first input signal in response to the received first input signal, and may provide a haptic feedback according to the determined haptic object or texture at a location corresponding to the information on the location. The processor 150 may transmit the determined haptic object or texture to the external electronic device through the communication unit 110. The processor 150 may receive a second input signal and information on a location where the second input signal is detected from the external electronic device through the communication unit 110. The processor 150 may identify a haptic object corresponding to the information on the location on the basis of the second input signal and the information on the location where the second input signal is detected that are received from the external electronic device, and may perform a function corresponding to the identified haptic object.

In addition, though not illustrated in FIG. 1, the electronic device may further selectively include elements having an additional function, such as a global locationing system (GPS) module for receiving location information, a camera module for photographing an image or a video, a broadcast reception module for receiving a broadcast, or the like.

Figure 2A:
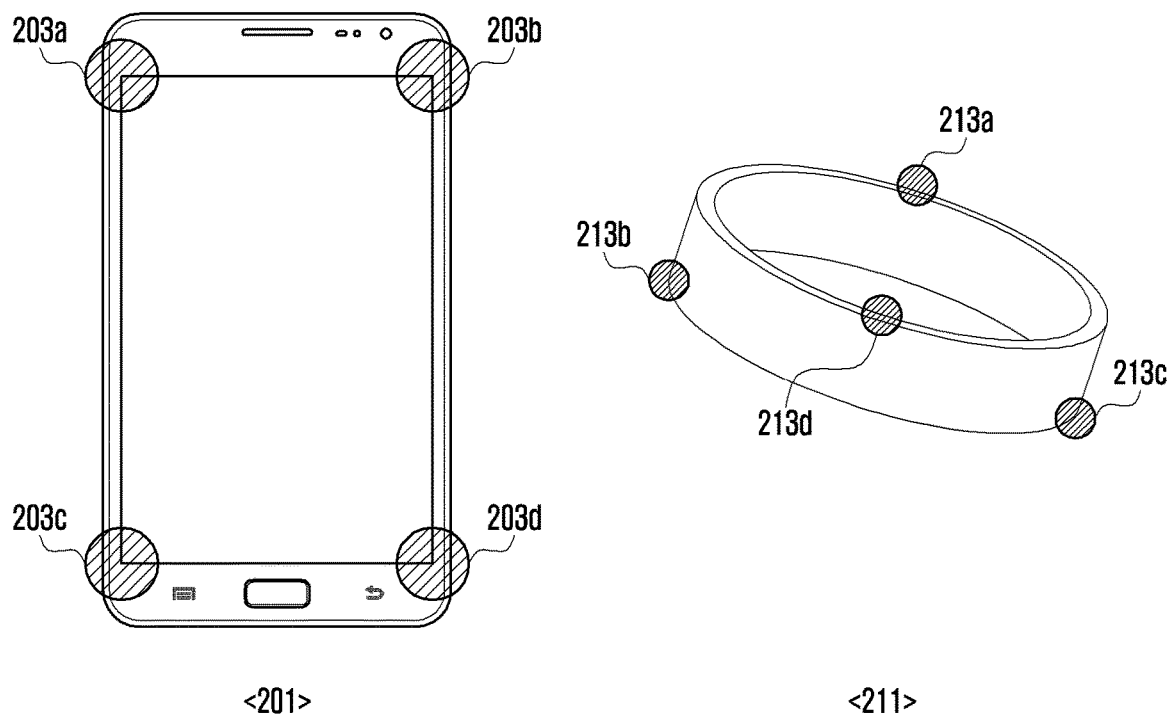
FIGS. 2A and 2B are diagrams illustrating example haptic modules disposed in electronic devices according to various example embodiments.
Figure 2A:
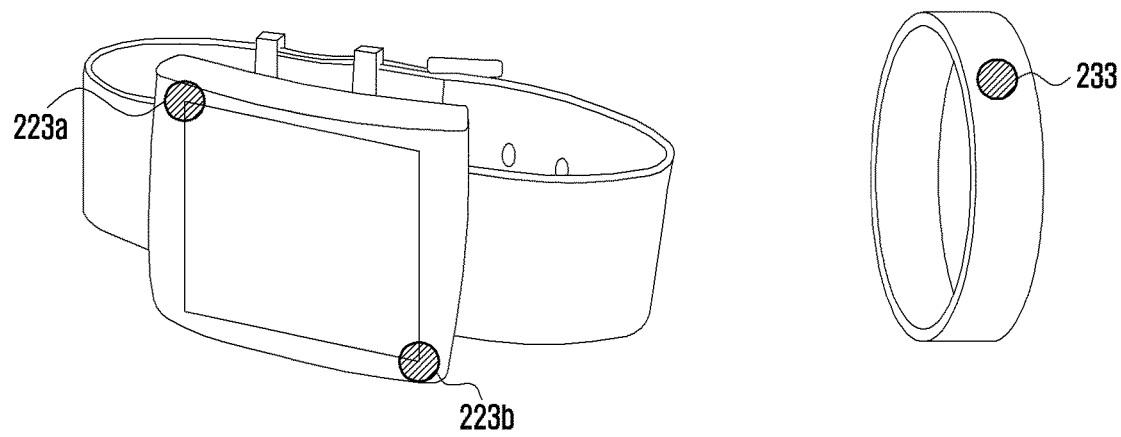
Figure 2B:
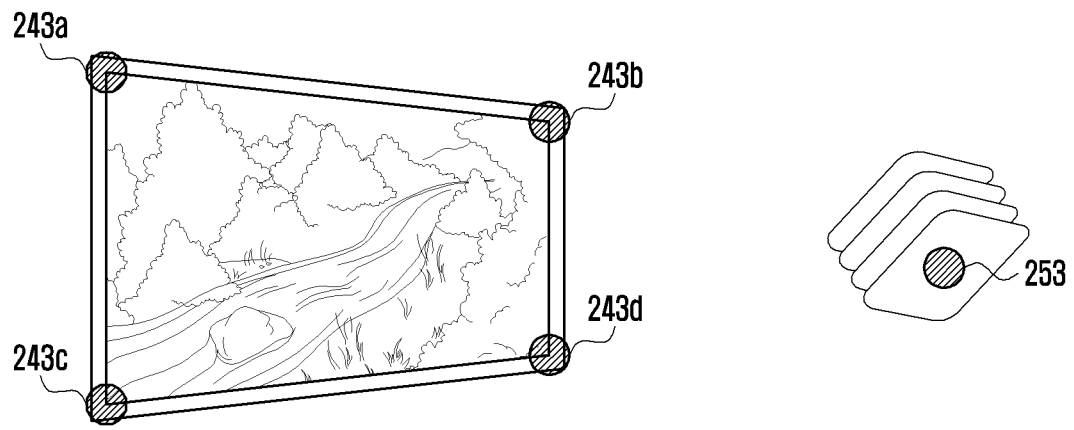
Figure 2B:
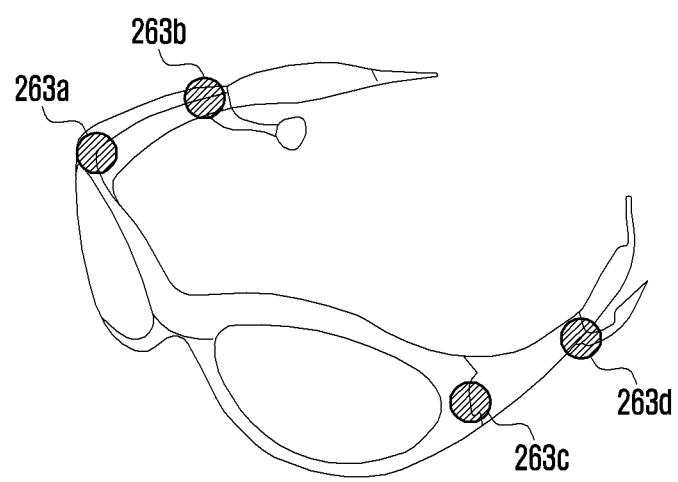

FIGS. 2A and 2B are diagrams illustrating example haptic modules (e.g., including haptic circuitry) disposed in electronic devices according to various embodiments.

Referring to FIGS. 2A and 2B, the haptic modules (140 of FIG. 1) according to various embodiments may provide a haptic feedback corresponding to a texture of a haptic object. The haptic feedback allows the user to feel a tactile by generating a vibration, force, impact, or a detection of temperature to the electronic device. The haptic feedback may be output in various textures by differently applying a vibration condition (for example, a vibration frequency, a vibration length, a vibration intensity, a vibration waveform, a vibration location, or the like) using the haptic module (140 of FIG. 1).

For example, when assuming that the electronic device includes three haptic modules (i.e., a first haptic module, a second haptic module, a third haptic module), the first to third haptic modules may be configured to output haptic feedbacks according to frequencies of 90 Hz, 70 Hz, and 50 Hz, respectively. The haptic feedback according to a texture may be output using at least one haptic module among the three haptic modules.

In various embodiments, as illustrated in 201 of FIG. 2A, in case that the electronic device is a smart phone, the haptic module may be disposed at corner portions 203*a*, 203*b*, 203*c*, and 203*d* of the smart phone. The processor (150 of FIG. 1) may output a haptic feedback according to a texture of a haptic object using at least one of the haptic modules disposed at corner portions 203*a*, 203*b*, 203*c*, and 203*d* of the smart phone.

In various embodiments, as illustrated in 211 of FIG. 2A, in case that the electronic device is a band type electronic device, the haptic module may be disposed as illustrated (see 213*a*, 213*b*, 213*c*, and 213*d*). The processor (150 of FIG. 1) may output a haptic feedback according to a texture of a haptic object using at least one of the haptic modules disposed in the band type electronic device as illustrated in FIG. 2A (see 213*a*, 213*b*, 213*c*, and 213*d*).

In an embodiment, as illustrated in 221 of FIG. 2A, in case that the electronic device is a smart watch, the haptic module may be disposed at a right upper corner 223*a* and left bottom corner 223*b* of the smart watch. The processor (150 of FIG. 1) may output a haptic feedback according to a texture of a haptic object using at least one of the haptic modules disposed at the right upper corner 223*a* and left bottom corner 223*b* of the smart watch.

In various embodiments, as illustrated in 231 of FIG. 2A, in case that the electronic device is a ring type electronic device, the haptic module may be disposed at a portion 233 of the ring type electronic device. The processor (150 of FIG. 1) may output a haptic feedback according to a texture of a haptic object using the haptic module disposed at a portion 233 of the ring type electronic device.

In various embodiments, as illustrated in 241 of FIG. 2B, in case that the electronic device is a large display, the haptic module may be disposed at each corner 243*a*, 243*b*, 243*c*, 243*d* of the large display. The processor (150 of FIG. 1) may output a haptic feedback according to a texture of a haptic object using at least one of the haptic modules disposed at each corner 243*a*, 243*b*, 243*c*, and 243*d* of the large display.

In various embodiments, as illustrated in 251 of FIG. 2B, in case that the electronic device is a patch type electronic device, the haptic module may be disposed at the center 253 of the patch type electronic device. The processor (150 of FIG. 1) may output a haptic feedback according to a texture of a haptic object using the haptic module disposed at the center 253 of the patch type electronic device.

In various embodiments, as illustrated in 261 of FIG. 2B, in case that the electronic device is smart eyeglasses, the haptic module may be disposed at leg portions 263*a*, 263*b*, 263*c*, and 263*d* of the smart eyeglasses. The processor (150 of FIG. 1) may output a haptic feedback according to a texture of a haptic object using at least one of the haptic modules disposed at leg portions 263*a*, 263*b*, 263*c*, and 263*d* of the smart eyeglasses.

In various embodiments, the location and number of the haptic module disposed in the electronic device are not limited to the above description, and at least one haptic module may be disposed at different locations.

Figure 3A:
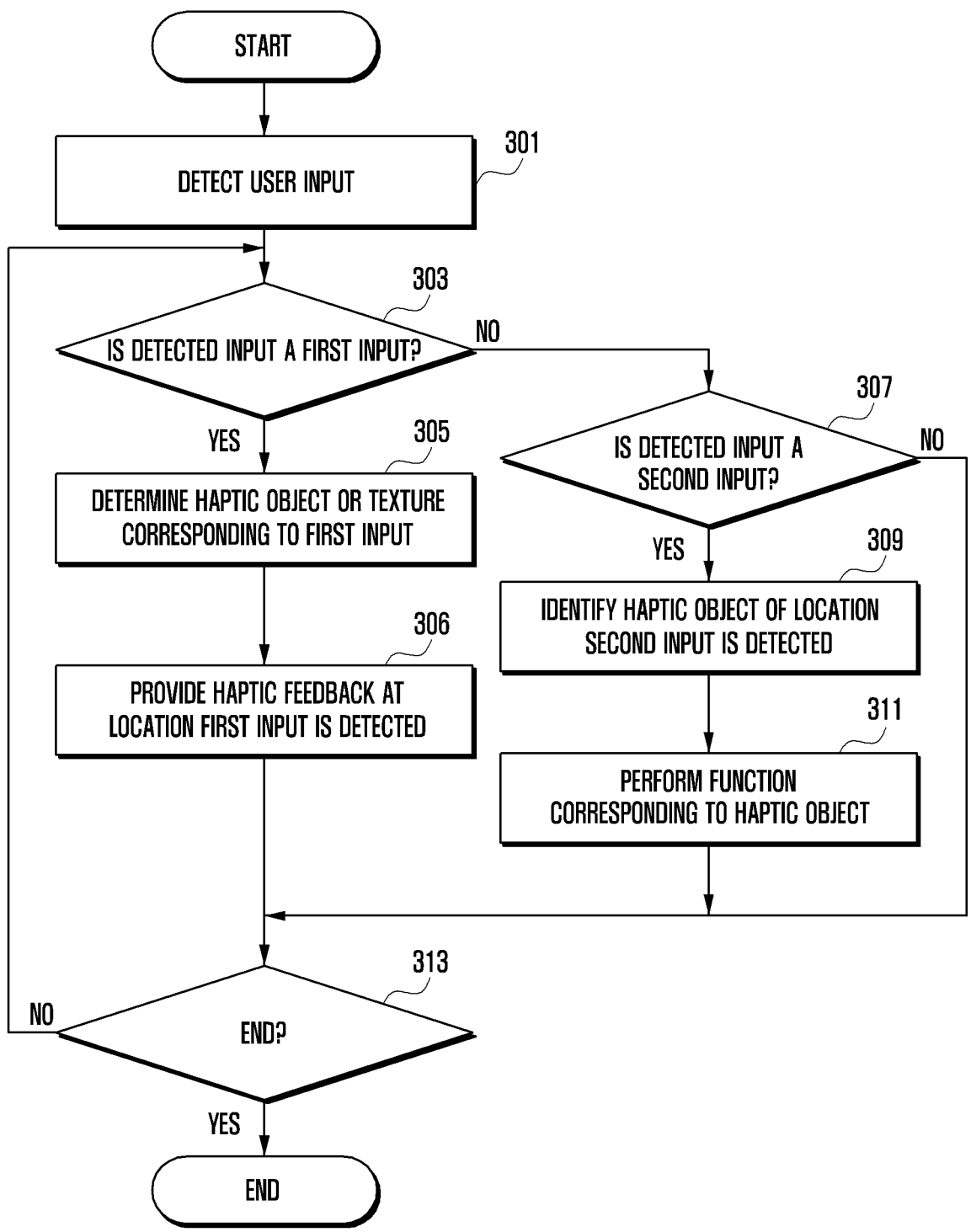
Figure 3B:
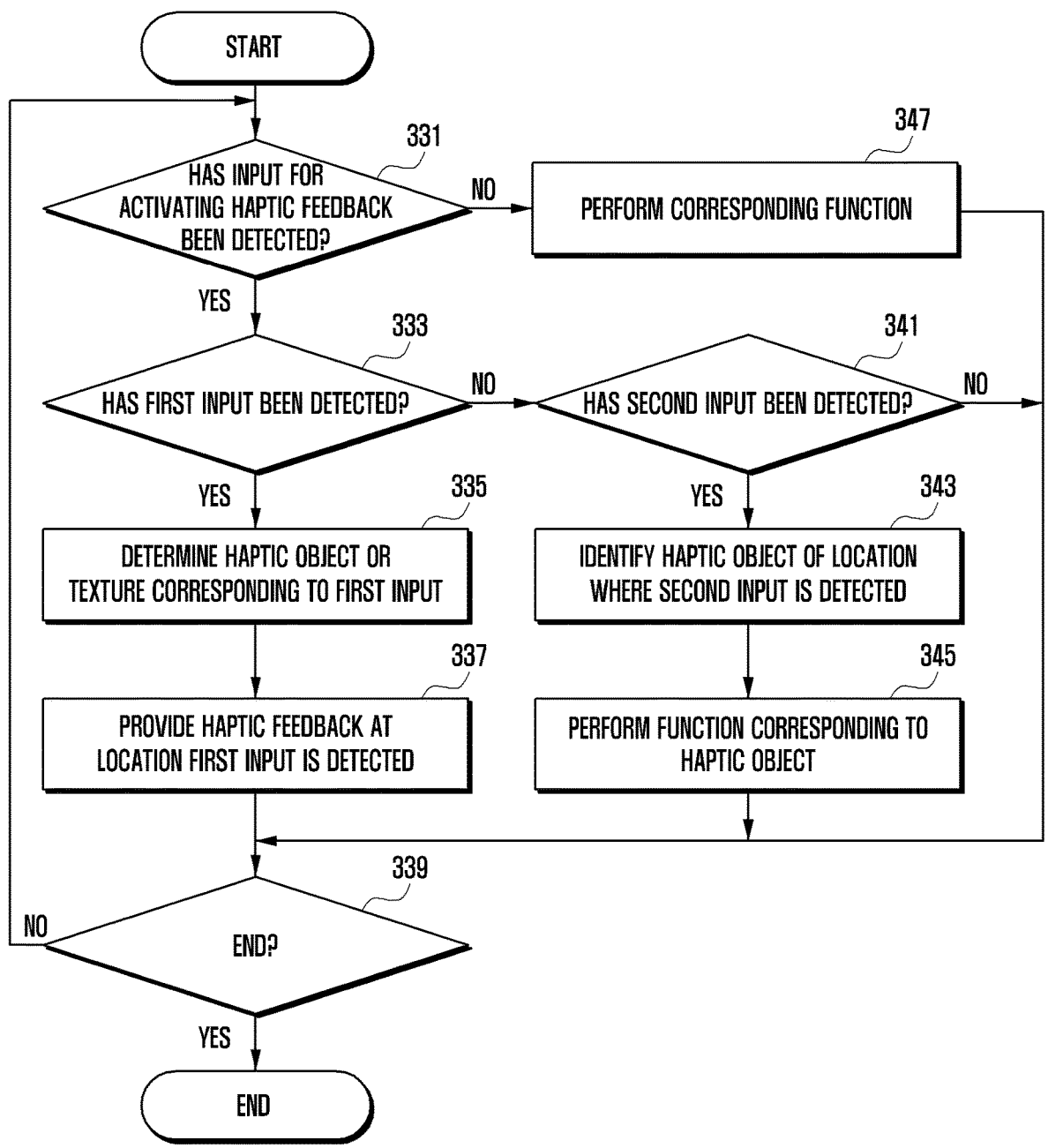

FIGS. 3A, 3B and 3C are flowcharts illustrating example methods of providing a haptic effect according to various embodiments.

Referring to FIG. 3A, the processor (150 of FIG. 1) may detect an input, such as, for example, a user input (operation 301). The user input may include, for example, and without limitation, at least one of a touch input and hovering input. In various embodiments, the user input may include at least one of a first input for providing a haptic feedback (for example, a first gesture) and a second input for requesting a function performance (for example, a second gesture). The first input for providing a haptic feedback may include an input determining a haptic object or texture for controlling a function (for example, a function relating to an audio play)

of the electronic device. The second input for requesting the function performance may include an input selecting the determined haptic object.

The processor (150 of FIG. 1) may determine whether the user input detected in operation 301 is the first input in operation 303, for example, the first gesture. In various embodiments, the first gesture may include a gesture drawing a specific pattern. For example, the first gesture may include a gesture of a circular pattern, a gesture of a triangle pattern, or the like. In this regard, it will be described in greater detail below with reference to FIG. 4.

Hereinafter, in describing various embodiments, it will be assumed that the first gesture is a gesture of a circular pattern.

If the user input is a first input, the processor (150 of FIG. 1) may determine a haptic object or texture corresponding to the first input (operation 305), and may provide a haptic feedback according to the texture at a location where the first input is detected (operation 306).

In various embodiments, in case that the electronic device includes a display unit (131 of FIG. 1), the processor (150 of FIG. 1) may additionally perform an operation to output by applying the texture to the haptic object corresponding to the first input.

In various embodiments, when the first input (for example, a circular pattern gesture) is detected, the processor (150 of FIG. 1) may determine a haptic feedback and texture corresponding to the circular pattern gesture. The processor (150 of FIG. 1) may output a haptic feedback corresponding to the texture at a region where the circular pattern gesture is detected using the haptic module (140 of FIG. 1). For example, the texture may include roughness, unevenness, smoothness, or texture of material (for example, paper, glass, wood, water leather, etc.), and the processor (150 of FIG. 1) may output the haptic feedback according to the texture using the haptic module (140 of FIG. 1).

In various embodiments, the processor (150 of FIG. 1) may determine a haptic object or texture on the basis of at least one of a movement distance of the circular pattern gesture and a location where the circular pattern gesture is detected. For example, when assuming that the haptic object or texture is determined on the basis of the movement distance of the circular pattern gesture, if the movement distance of the circular pattern gesture is an angle of 45 degree, the processor (150 of FIG. 1) may determine as a first object and a first texture. The processor (150 of FIG. 1) may output a haptic feedback according to the first texture at a location where the gesture is detected using the haptic module (140 of FIG. 1). If the movement distance of the circular pattern gesture is an angle of 90 degree, the processor (150 of FIG. 1) may determine as a second object and a second texture. The processor (150 of FIG. 1) may output a haptic feedback according to the second texture at a location where the gesture is detected using the haptic module (140 of FIG. 1). In this regard, it will be described later through FIG. 5 in detail.

In describing various embodiments, it will be assumed that the haptic object or texture is determined on the basis of the location where the circular pattern gesture is detected, for example, a starting point. For example, if the circular pattern gesture is detected in a direction of 0 degree, the processor (150 of FIG. 1) may determine as a first haptic object and a first texture. The processor (150 of FIG. 1) may output a haptic feedback according to the first texture using the haptic module (140 of FIG. 1). If the circular pattern gesture is detected in a direction of 90 degrees, the processor (150 of FIG. 1) may determine as a second haptic object and a second texture. The processor (150 of FIG. 1) may output a haptic feedback according to the second texture using the haptic module (140 of FIG. 1).

In various embodiments, the haptic object may be output within a predetermined distance from the starting point where the first input is detected. If the first input is a circular pattern gesture, the haptic object may be output at a central point of the detected circular pattern gesture, or may be output within a predetermined distance on the basis of the central point.

In various embodiments, the first input (for example, the first gesture) may be detected in different patterns in different locations by multiple times. Accordingly, a plurality of haptic objects or textures may be determined and haptic feedbacks according to the textures may be output.

In various embodiments, in case that a haptic feedback according to a texture determined by an electronic device (for example, a band type electronic device, a ring type electronic device) that does not include the display unit (131 of FIG. 1) is output, the user can distinguish the haptic object through a vibration effect according to the texture.

If the user input of operation 303 is not a first input in operation 303, the processor (150 of FIG. 1) may determine whether the user input is a second input (operation 307).

If the user input is the second input, the processor (150 of FIG. 1) may identify a haptic object of a location where the second input is detected (operation 309), and may perform a function corresponding to the identified haptic object (operation 311).

In various embodiments, the second input (for example, the second gesture) may be an input selecting a haptic object. For example, if the haptic object is an object for controlling an audio play, the second gesture may include a gesture selecting at least one of a previous audio play object, a next audio play object, an audio play stop object, and an audio play object. For example, if an audio is being played, the processor (150 of FIG. 1) may output a previous audio play object, an audio play stop object, and a next audio play object. If a gesture selecting the audio play stop object for stopping the audio play is detected, the processor (150 of FIG. 1) may perform an operation of stopping the play of the audio that is being currently played. The processor (150 of FIG. 1) may change the audio play stop object into the audio play object and output the audio play object, in response to the operation of stopping the play of the playing audio. In other words, in case of a haptic object having a toggle function (for example, on/off, play/stop, start/stop), a second input (for example, a second gesture) is detected from the haptic object, the processor (150 of FIG. 1) may change and output the haptic object or texture.

The user may distinguish the multiple haptic objects through textures of the haptic objects, in accordance with this, and may identify functions of the distinguished multiple haptic objects and may select a haptic object to be performed among the multiple haptic objects.

The processor (150 of FIG. 1) may determine whether the operation is to be finished (operation 313). In various embodiments, if the first input and second input are not detected, the processor (150 of FIG. 1) may determine that the operation is finished. If at least one of the first input and second input is detected, the processor (150 of FIG. 1) may be branched into operation 303.

Embodiments for FIG. 3A described above according to various embodiments will be described in greater detail below with reference to FIGS. 6, 8A, 9A, 9B and 10.

Referring to FIG. 3B, the processor (150 of FIG. 1) may determine whether an input for activating a haptic feedback is detected (operation 331). In various embodiments, the input for activating the haptic feedback may include a double tap.

If the input for activating a haptic feedback is detected, the processor (150 of FIG. 1) may determined whether the first input is detected (operation 333). As described above, the first input may include an input selecting a haptic object or texture for controlling a specific function of an electronic device. For example, the first input may include a gesture drawing a specific pattern. For example, the first input may include a gesture of a circular pattern, a gesture of a triangle pattern, or the like.

If the first input is detected, the processor (150 of FIG. 1) may determine a haptic object or texture corresponding to the first input (operation 335), and may provide a haptic feedback at a location where the first input is detected (operation 337). Operations 333 to 337 of FIG. 3B are the same as operations 303 to 306 of FIG. 3A, therefore, detailed descriptions therefor will be omitted.

In various embodiments, the processor (150 of FIG. 1) may determine whether the operation will be ended (operation 339). If the operation is determined to be ended, the processor (150 of FIG. 1) may end the operation. If the operation is not determined to be ended, the processor (150 of FIG. 1) may be branched into operation 331 and may determine whether the input for activating the haptic feedback is detected. If the input for activating the haptic feedback is detected, the processor (150 of FIG. 1) may determined whether the first input is detected (operation 333). If the first input is detected, the processor (150 of FIG. 1) may repeatedly perform the above-described operations 335 to 339.

In various embodiments, in a state that the input for activating a haptic feedback is detected, if the first input is not detected, the processor (150 of FIG. 1) may determine whether the second input is detected (operation 341). As described above, the second input may include an input selecting a haptic object for performing a specific function of an electronic device.

If the second input is detected, the processor (150 of FIG. 1) may identify a haptic object of a location where the second input is detected (operation 343), and may perform a function corresponding to the identified haptic object (operation 345). Operations 341 to 345 of FIG. 3B are the same as operations 307 to 311 of FIG. 3A, therefore, detailed descriptions will be omitted.

If the input for outputting a haptic feedback is not detected in operation 331, the processor (150 of FIG. 1) may perform a corresponding function in operation 347. For example, the corresponding function may include, for example, an operation to generally perform a function through an application, not an operation to perform a function of an electronic device through the haptic object.

Embodiments for FIG. 3B described above according to various embodiments will be described in greater detail below with reference to FIGS. 7A and 7B.

Referring to FIG. 3C, in various embodiments, a first electronic device 101 and a second electronic device 103 may be connected to each other through a communication unit (110 of FIG. 1). As the first electronic device 101 and the second electronic device 103 are connected to each other through the communication unit (110 of FIG. 1) (operation 351), the first electronic device 101 and the second electronic device 103 may display the same content images. In other words, the first electronic device may display the content image in operation 353. The second electronic device may display the content image in operation 355.

In various embodiments, the second electronic device 103 may detect a first input for determining a haptic object or texture for controlling a specific function of the electronic device (operation 357). The second electronic device 103 may transmit the detected first input signal and information on a location where the first input is detected to the first electronic device 101 through the communication unit (110 of FIG. 1) (operation 359).

In various embodiments, the first electronic device 101 may determine a haptic object or texture corresponding to the first input signal in response to the first input signal received from the second electronic device 103 (operation 361). The first electronic device 101 may transmit the determined haptic object or texture to the second electronic device 103 (operation 363). The first electronic device 101 may provide a haptic feedback according to the determined haptic object or texture to a location corresponding to the information on the location where the first input signal is detected, the information being received from the second electronic device 103 (operation 365).

In various embodiments, the second electronic device 103 may provide a haptic feedback according to the determined haptic object or texture, which is received from the first electronic device 101 (operation 367).

In various embodiments, though it is described that operations 361 and 363 are performed in the first electronic 101, but not limited thereto. Operations 361 and 363 may be performed in the second electronic device 103. For example, the second electronic device 103 may determine a haptic object or texture corresponding to the first input signal in response to the first input signal. The second electronic device 103 may transmit the determined haptic object or texture to the first electronic device 101. The first electronic device 101 may provide a haptic feedback according to the determined haptic object or texture to a location corresponding to the information on the location where the first input signal is detected, the information being received from the second electronic device 103, in operation 365. The second electronic device 103 may provide the haptic feedback according to the determined haptic object or texture in operation 367.

In various embodiments, the second electronic device 103 may detect a second input (operation 369). The second electronic device 103 may transmit a second input signal and information on a location where the second input signal is detected to the first electronic device 101 (operation 371). The first electronic device 101 may identify a haptic object of the location where the second input is detected (operation 373), and may perform a function corresponding to the identified haptic object (operation 375).

Embodiments for FIG. 3C described above according to various embodiments will be described in greater detail below with reference to FIG. 8B.

Figure 4:
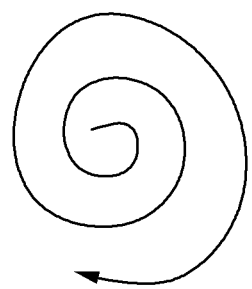
FIG. 4 is a diagram illustrating an example method of providing a haptic effect according to various example embodiments.
Figure 4:
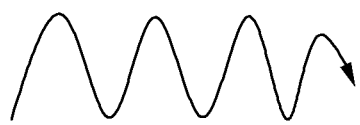
Figure 4:
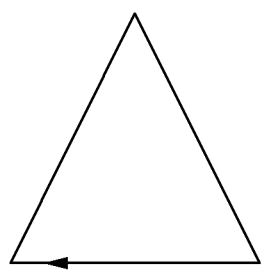
Figure 4:
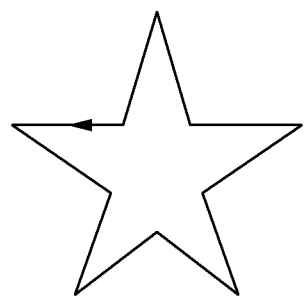

FIG. 4 is a diagram illustrating an example method of providing a haptic effect according to various embodiments.

Referring to FIG. 4, as described above in various embodiments, a first gesture corresponds to a gesture drawing a specific pattern, and may include a circular pattern gesture as illustrated in 400 of FIG. 4, a zigzag pattern as illustrated in 410 of FIG. 4, a triangle pattern gesture illustrated in 420 of FIG. 4, and a star pattern gesture illustrated in 430 of FIG. 4, but is not limited thereto.

In various embodiments, a haptic feedback may be output in different textures on the basis of a movement distance of the detected gesture and location where the gesture is detected.

In various embodiments, if a gesture including one of the gestures 400, 410, 420, and 430 of FIG. 4 is detected, the processor (150 of FIG. 1) may identify a movement distance of the gesture and location where the gesture is detected, and may determine a haptic object or texture corresponding thereto. The haptic object may be, for example, an object for controlling an electronic device or a function of the electronic device. The haptic object may include, for example: objects for controlling the displaying on/off of an electronic device, changing into an idle mode, changing into a sleep mode, power on/off, and carrying out a specific application; an object for controlling an audio play; an object for editing a document; an object for performing an approval function; an object for performing a file transmission/reception function, or the like. The processor (150 of FIG. 1) may output a haptic feedback according to the determined texture using the haptic module (140 of FIG. 1).

In this connection, it will be described in greater detail below with reference to FIG. 5.

Figure 5:
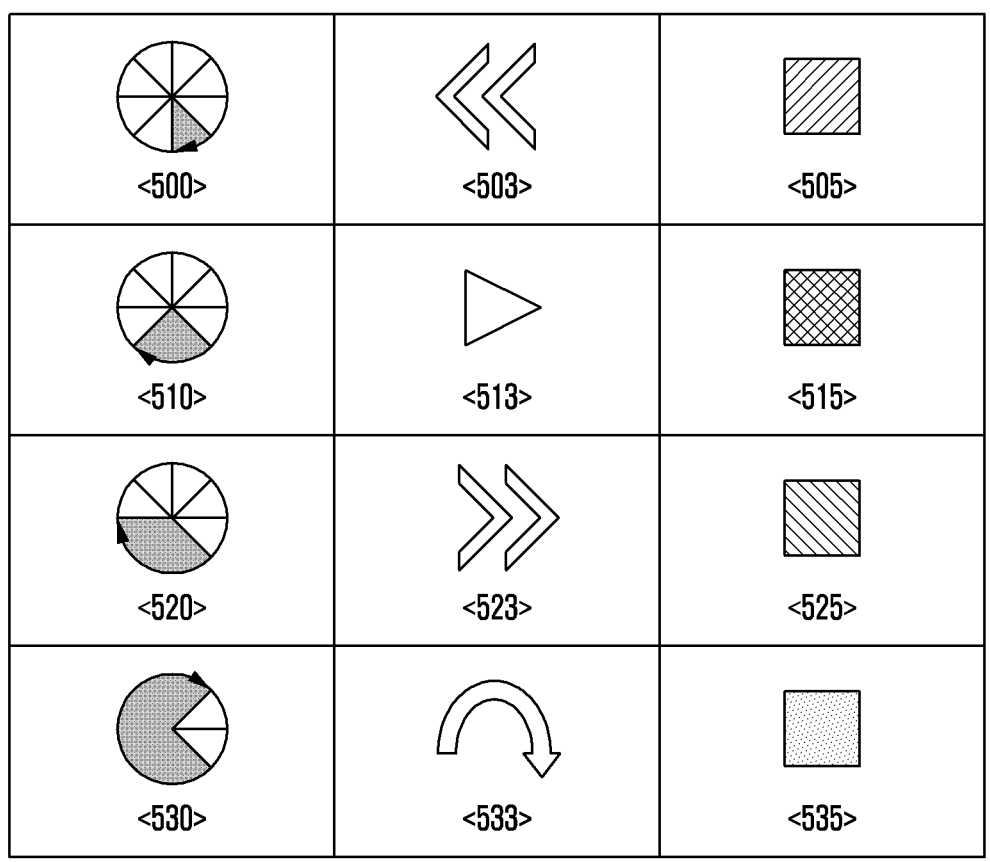
FIG. 5 is a chart illustrating example haptic objects according to various example embodiments.

FIG. 5 is a diagram illustrating an example method of providing a haptic effect according to various embodiments.

Referring to FIG. 5, the processor (150 of FIG. 1) may detect a first input, for example, a first gesture. In various embodiments, it will be described by assuming that the first gesture is a circular pattern gesture, and the haptic object is a haptic object for controlling an audio play. The haptic object for controlling an audio play may include a previous audio play haptic object, an audio play haptic object, an audio play stop haptic object, and a next audio play haptic object.

In various embodiments, if the circular pattern gesture is detected, the electronic device including the display unit (131 of FIG. 1) may determine a haptic object or texture corresponding to the circular pattern gesture, and may display the determined haptic object or texture on the display unit (131 of FIG. 1). An electronic device that does not include the display unit (131 of FIG. 1) may distinguish the haptic object by outputting a vibration effect according to the texture of the haptic object when the circular pattern gesture is detected, though the haptic object or texture corresponding to the circular pattern gesture is not displayed visually.

As illustrated in 500 of FIG. 5, the processor (150 of FIG. 1) may detect a gesture drawing a circular pattern, for example, a gesture moved by 45 degrees. The processor (150 of FIG. 1) may determine a haptic object or texture corresponding to the gesture moved by 45 degrees as a previous audio play haptic object illustrated in 503 of FIG. 5 and a texture hatched from top right to bottom left, which is illustrated in 505 of FIG. 5. In other words, the processor (150 of FIG. 1) may output a haptic feedback of a texture 505 hatched from top right to bottom left at a location where the circular pattern gesture 500 moved by 45 degrees is detected, in response to the gesture 500 moved by 45 degrees.

The processor (150 of FIG. 1) may determine whether a second input (for example, a second gesture) is detected in the previous audio play haptic object 503. In various embodiments, the second gesture may include, for example, a gesture selecting the previous audio play haptic object 503. If an input selecting the previous audio play haptic object 503 is detected, the processor (150 of FIG. 1) may perform an operation to move into the top of a music being played.

In addition, if a long press is detected in the haptic object 503, the processor (150 of FIG. 1) may perform an operation to move to the music five songs before the music that is currently playing.

In various embodiments, the processor (150 of FIG. 1) may detect a gesture drawing a circular pattern, for example, a gesture 510 moved by 90 degrees. The processor (150 of FIG. 1) may determine a haptic object or texture corresponding to the gesture 510 moved by 90 degrees as an audio play haptic object illustrated in 513 of FIG. 5 and a texture hatched from top left to bottom right, which is illustrated in 515 of FIG. 5. In other words, the processor (150 of FIG. 1) may output a haptic feedback of a texture 515 hatched from top right to bottom left at a location where the circular pattern gesture 510 moved by 90 degrees is detected, in response to the gesture 510 moved by 90 degrees.

If a second input (for example, a second gesture) is detected in the audio play haptic object 513, the processor (150 of FIG. 1) may perform an operation to play audio.

In various embodiments, if a second gesture is detected in the audio play haptic object 513, the processor (150 of FIG. 1) may change the audio play haptic object 513 into an audio play stop haptic object. For example, if a second gesture is detected from the audio play haptic object 513, the processor (150 of FIG. 1) may play the audio, and may change the audio play haptic object 513 into an audio play stop haptic object or texture to output.

In other words, in various embodiments, in case of a haptic object having a toggle function (for example, on/off, play/stop, and start/stop), if the second input is detected in the haptic object having the toggle function, the processor (150 of FIG. 1) may change into the haptic object or texture to output.

In various embodiments, as illustrated in 520 of FIG. 5, the processor (150 of FIG. 1) may detect a gesture drawing a circular pattern, for example, a gesture moved by 135 degrees. The processor (150 of FIG. 1) may determine a haptic object or texture corresponding to the gesture 520 moved by 135 degrees as a next audio play haptic object illustrated in 523 of FIG. 5 and a texture hatched from top right to bottom left, and hatched from top left to bottom right, which is illustrated in 525 of FIG. 5. In other words, the processor (150 of FIG. 1) may output a haptic feedback of a texture 525 hatched from top right to bottom left and hatched from top left to bottom right, at a location where the circular pattern gesture 520 moved by 135 degrees is detected, in response to the gesture 520 moved by 135 degrees.

If a second input (for example, a second gesture) is detected in the next audio play haptic object 523, the processor (150 of FIG. 1) may perform an operation to move into a next song of a song being played. In addition, if a long press in the next audio play haptic object 523 is detected, the processor (150 of FIG. 1) may perform an operation to move to the subsequent five songs of the song that is currently playing.

In various embodiments, as illustrated in 530 of FIG. 5, the processor (150 of FIG. 1) may detect a gesture drawing a circular pattern, for example, a gesture moved by 270 degrees. The processor (150 of FIG. 1) may determine a haptic object or texture corresponding to the gesture 530 moved by 270 degrees as a haptic object illustrated in 533 of FIG. 5 and a shaded texture illustrated in 535 of FIG. 5. In other words, the processor (150 of FIG. 1) may output a haptic feedback of the shaded texture 535 at a location where the gesture 530 moved by 270 degrees is detected, in response to the gesture 530 moved by 270 degrees.

If the input selecting the haptic object 533 is detected, the processor (150 of FIG. 1) may perform an operation to move to other folder or other play list to play audio.

Figure 6:
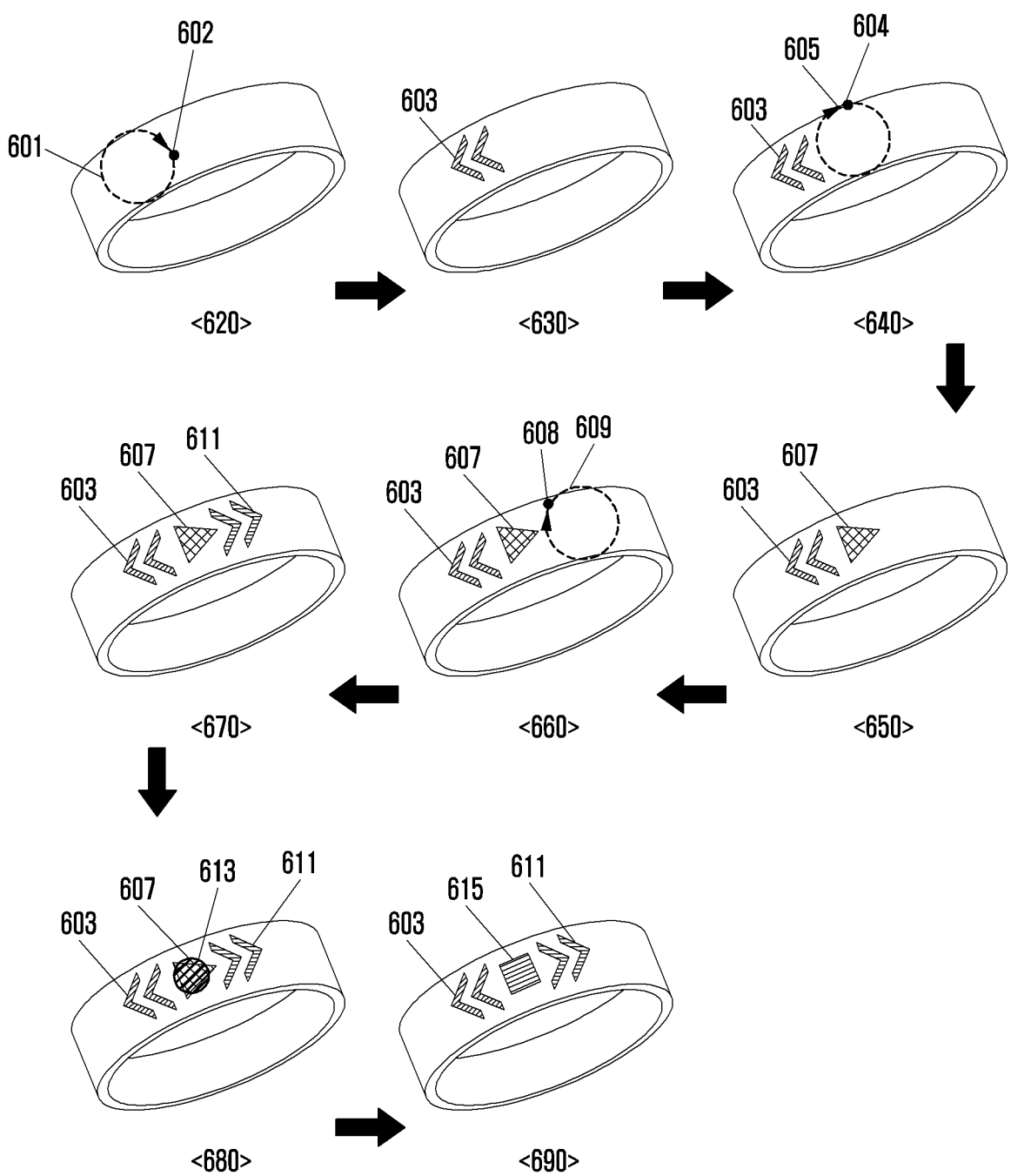
FIG. 6 is a diagram illustrating an example method of providing a haptic effect in a band type electronic device according to various example embodiments.

FIG. 6 is a diagram illustrating an example method of providing a haptic effect in a band type electronic device according to various embodiments.

In various embodiments, FIG. 6 is a view for describing a method of providing a haptic in a band type electronic device which does not include a display unit (131 of FIG. 1). Although it is illustrated that a haptic object or texture corresponding to a circular pattern gesture is displayed visually, when the circular pattern gesture is detected in the band type electronic device which does not include a display unit. However, this is for easy explanation, and the haptic object or texture may not be displayed visually. The haptic object may be distinguished by a tactile effect according to a texture of the haptic object, but it is not limited thereto.

The haptic object or texture corresponding to the circular pattern gesture described hereinafter will be assumed to be determined on the basis of a location where the circular pattern gesture is detected.

Referring to FIG. 6, the band type electronic device may detect a circular pattern gesture 601 having location 602 as a starting point, as illustrated in 620 of FIG. 6. The processor (150 of FIG. 1) may determine a haptic object or texture corresponding to the circular pattern gesture 601 having location 602 as a starting point. For example, the processor (150 of FIG. 1) may determine a haptic object 603 to which a texture of a form hatched from top right to bottom left is applied as a haptic object corresponding to the circular pattern gesture 601 having location 602 as a starting point. As illustrated in 630 of FIG. 6, the processor may output a haptic feedback of a texture hatched from top right to bottom left at a location where the circular pattern gesture 601 is detected.

As described above, the band type electronic device does not include the display unit (131 of FIG. 1). Therefore, the user may distinguish the haptic object by a vibration effect generated through the haptic module (141 of FIG. 1) on the basis of the texture of the haptic object.

In various embodiments, the processor (150 of FIG. 1) may detect a circular pattern gesture 605 having location 604 as a starting point in the band type electronic device, as illustrated in 640 of FIG. 6. The processor 150 may determine a haptic object or texture corresponding to the circular pattern gesture 605 having location 604 as a starting point. For example, the processor (150 of FIG. 1) may determine the circular pattern gesture 605 having location 604 as a starting point to a haptic object 607 to which a texture hatched from top right to bottom left and hatched from top left to bottom right is applied, and may output a haptic feedback of the texture hatched from top right to bottom left and hatched from top left to bottom right at a location where the circular pattern gesture 605 is detected, as illustrated in 650 of FIG. 6.

In various embodiments, the band type electronic device may detect a circular pattern gesture 609 having location 608 as a starting point, as illustrated in 660 of FIG. 6. The processor (150 of FIG. 1) may determine a haptic object or texture corresponding to the circular pattern gesture 609 having location 608 as a starting point. For example, the processor (150 of FIG. 1) may determine the circular pattern gesture 609 having location 608 as a starting point to a haptic object 611 to which a texture hatched from top left to bottom right is applied, and may output a haptic feedback of a texture hatched from top left to bottom right at a location where the circular pattern gesture 609 is detected, as illustrated in 670 of FIG. 6.

In various embodiments, the processor (150 of FIG. 1) may detect a second input, for example, a second gesture. For example, functions of the electronic device, which correspond to the haptic objects 603, 607, 611, may be the same as illustrated in FIG. 5. For example, the processor (150 of FIG. 1) may detect a second gesture (for example, a touch input 613) in the haptic object 607 to which a texture hatched from top right to bottom left and hatched from top left to bottom right is applied as output as the circular pattern gesture 605 is detected as illustrated in 680 of FIG. 6. If the touch input 613 is detected, the processor (150 of FIG. 1) may perform a function of the electronic device, which corresponds to the haptic object 607. For example, referring to the above-described FIG. 5, it can be identified that the function of the electronic device, which corresponds to the haptic object 607, is an audio play operation. In other words, if the touch input 613 is detected in the haptic object 607, the processor (150 of FIG. 1) may perform the audio play operation.

In various embodiments, if the touch input 613 is detected in the haptic object 607, the processor (150 of FIG. 1) may determine whether the haptic object 607 has a toggle function. If the haptic object 607 has the toggle function, the processor (150 of FIG. 1) may change the haptic object 607 into a haptic object 615 of a texture striped from left to right to output, as illustrated in 690 of FIG. 6.

Figure 7A:
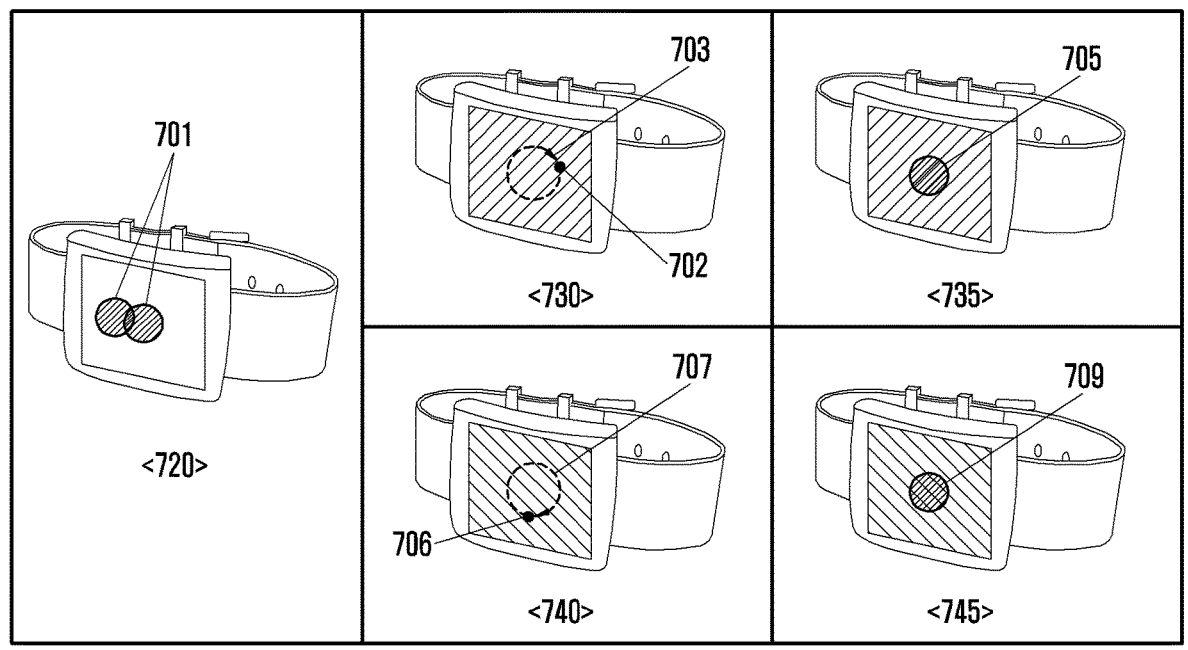
FIGS. 7A and 7B are diagrams illustrating an example method of providing a haptic effect in a smart watch according to various example embodiments.
Figure 7B:
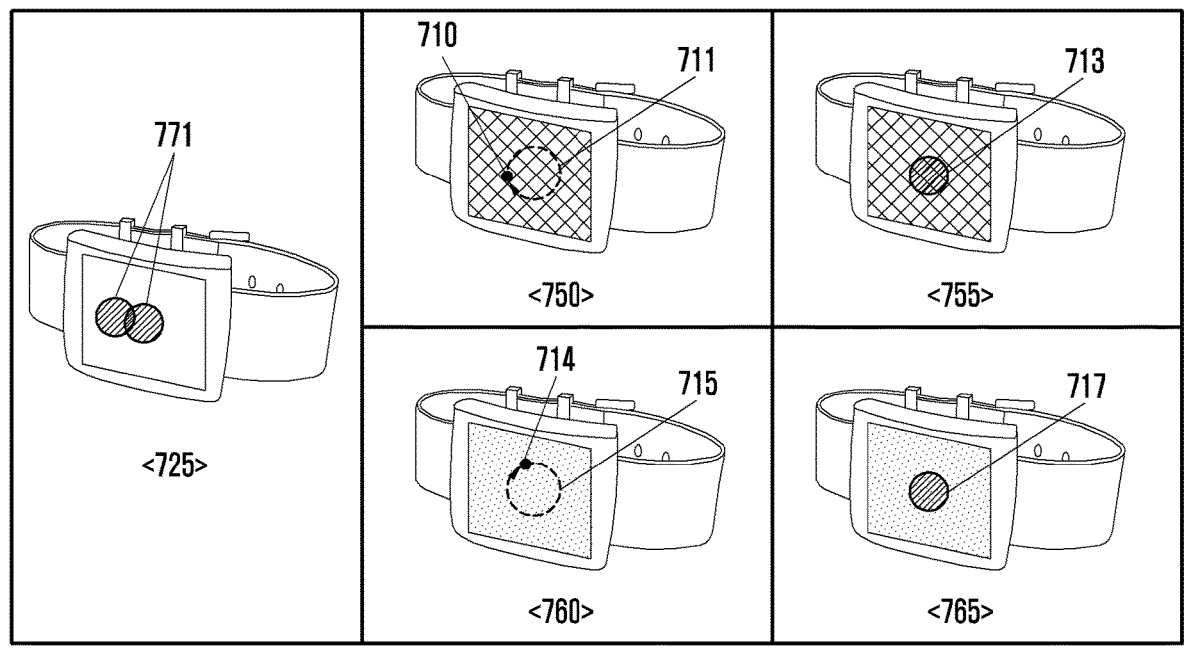

FIGS. 7A and 7B are diagrams illustrating example methods of providing a haptic effect in a smart watch according to various example embodiments.

In various embodiments, the smart watch may include a display unit (131 of FIG. 1). Accordingly, when a circular pattern gesture is detected, a haptic object or texture corresponding to the circular pattern gesture may be displayed visually, and a tactile effect according to the texture may be output using the haptic module (140 of FIG. 1).

In various embodiments, a first double tap 701 and a second double tab 771 described hereinafter are for preventing operations that may be performed due to a user input that is not intended. A haptic object or texture may be determined by successive inputs of the first double tap 701 and a first input, and a haptic feedback corresponding to the haptic object or texture may be provided. Also, a function corresponding to the haptic object may be performed through successive inputs of the second double tap 771 and a second input. Hereinafter, an input for preventing operations that may be performed due to an unintended user input is assumed as the first double tap 701 and second double tap 771, but is not limited thereto. The inputs may be different inputs from each other.

Referring to FIGS. 7A and 7B, as illustrated in 720 of FIG. 7A, if the processor (150 of FIG. 1) detects the first double tap 701, the processor (150 of FIG. 1) may enter a state to receive a gesture for determining a haptic object or texture of the electronic device.

After entering the state to receive a gesture for determining a haptic object or texture of the electronic device in response to the first double tap 701, the processor (150 of FIG. 1) may detect a circular pattern gesture 703 having a location 702 (for example, 315 degrees) as a starting point, as illustrated in 730 of FIG. 7A. The processor (150 of FIG. 1), as illustrated in 730 of FIG. 7A, may display a texture hatched from top left to bottom right corresponding to the circular pattern gesture 703 having the location 702 as a starting point through the display unit (131 of FIG. 1).

In a state in which the texture hatched from top left to bottom right is displayed, the second double tap 771 is detected as illustrated in 725 of FIG. 7A, the processor (150 of FIG. 1) may enter a state to receive an input for performing a specific function of the electronic device. After entering the state to receive an input for performing a specific function of the electronic device in response to the second double tap 771, the processor (150 of FIG. 1) may detect a touch input 705 as illustrated in 735 of FIG. 7A. In response to the touch input 705, the processor (150 of FIG. 1) may perform a function (for example, a telephone application), which corresponds to the circular pattern gesture 703 having a location 702 (for example, 315 degree) as a starting point.

In various embodiments, after the smart watch enters the state to receive a gesture for determining a haptic object or texture of the electronic device in response to the detected first double tap 701, if the circular pattern gesture 707 having location 706 (for example, 180 degrees) as a starting point is detected, as illustrated in 740 of FIG. 7A, the processor (150 of FIG. 1) may display a texture hatched from top right to bottom left corresponding to the circular pattern gesture 707 through the display unit (131 of FIG. 1).

In a state in which the texture hatched from top right to bottom left is displayed, if the second double tap 771 is detected as illustrated in 725 of FIG. 7A, the processor (150 of FIG. 1) may enter a state to perform a specific function of the electronic device. After entering the state to perform the specific function of the electronic device in response to the second double tap 771, the processor (150 of FIG. 1) may detect a touch input 709 as illustrated in 745 of FIG. 7A. In response to the touch input 709, the processor (150 of FIG. 1) may perform a function corresponding to the circular pattern gesture 707, for example, may perform an audio play operation.

Similar to the above description, according to various embodiments, after the smart watch enters a state to receive a gesture for determining the haptic object or texture of the electronic device in response to the detected first double tap 701, if a circular pattern gesture 711 having location 710 (for example, 90 degrees) as a starting point is detected as illustrated in 750 of FIG. 7*b*, the processor (150 of FIG. 1) may display a texture hatched from top right to bottom left and hatched from top left to bottom right corresponding to the circular pattern gesture 711 through the display unit (131 of FIG. 1).

In a state in which the texture hatched from top right to bottom left and hatched from top left to bottom right is displayed, if the second double tap 771 is detected as illustrated in 725 of FIG. 7B, the processor (150 of FIG. 1) may enter a state to perform a specific function of the electronic device. After entering the state to perform a specific function of the electronic device in response to the second double tap 771, if a touch input 713 is detected as illustrated in 755 of FIG. 7B, the processor (150 of FIG. 1) may perform a function corresponding to the circular pattern gesture 711, for example, a file search function.

Similar to the above description, according to various embodiments, after the smart watch enters the state to receive a gesture for determining the haptic object or texture of the electronic device in response to the detected first double tap 701, if a circular pattern gesture 715 having location 714 (for example, 45 degrees) as a starting point is detected as illustrated in 760 of FIG. 7*b*, the processor (150 of FIG. 1) may display a shaded texture corresponding to the circular pattern gesture 715 through the display unit (131 of FIG. 1).

In a state in which the shaded texture is displayed, if the second double tap 771 is detected as illustrated 725 of FIG. 7B, the processor (150 of FIG. 1) may enter a state to perform a specific function of the electronic device. After entering the state to perform a specific function of the electronic device in response to the second double tap 771, if a touch input 717 is detected, the processor (150 of FIG. 1) may perform a ready mode operation. The ready mode means to perform a function with respect to a user gesture and motion for a predetermined time period. In general, the smart watch may cause a lot of motion as worn on the user's wrist. Accordingly, the processor may detect a user's motion for a predetermined time period, and may perform the function corresponding to the motion by entering the ready mode.

As described above, after the processor (150 of FIG. 1) enters the state to receive a gesture for determining a haptic object or texture in response to the first double tap 701, the processor (150 of FIG. 1) may display the texture corresponding to the circular pattern gesture at a starting location where the circular pattern gesture is detected. After entering the state to perform a specific function of the electronic device in response to the second double tap 771 detected in the state in which the texture is displayed, if a second input (for example, a touch input) is detected, the processor (150 of FIG. 1) may perform a function of the electronic device, which corresponds to the circular pattern gesture. The user may identify the function of the electronic device through a tactile effect according to the texture without seeing the screen of the electronic device, and may perform the function of the electronic device through the touch input.

As described above, in various embodiments, if the first double tap 701 is detected, the processor (150 of FIG. 1) may determine as a state to receive an input for determining a haptic object or texture, and may detect the first input for determining the haptic object or texture. If the first input is not detected for a predetermined time period in the state to receive the input for determining the haptic object or texture through the first double tap 701, the processor (150 of FIG. 1) may release the state to receive the input for determining the haptic object or texture.

In various embodiments, if the second double tap 771 is detected, the processor (150 of FIG. 1) may determine as a state to receive an input for performing a specific function of the electronic device, and may detect a second input for performing the specific function of the electronic device. If the second input is not detected for a predetermined time period in the state to receive the input for performing the specific function of the electronic device by the second double tap 771, the processor (150 of FIG. 1) may release the state to receive the input for performing the specific function of the electronic device.

In various embodiments, as the processor enters a state to receive the input for determining the haptic object or texture through the successive inputs of the first double tap 701 and the first input (for example, a circular pattern gesture), the input may be distinguished from an unintended input. In addition, as the processor performs a specific function through the successive inputs of the second double tap 771 and the second input (for example, a touch input), an inconvenience in which the function is carried out by an input that is not intended by the user can be prevented.

Figure 8A:
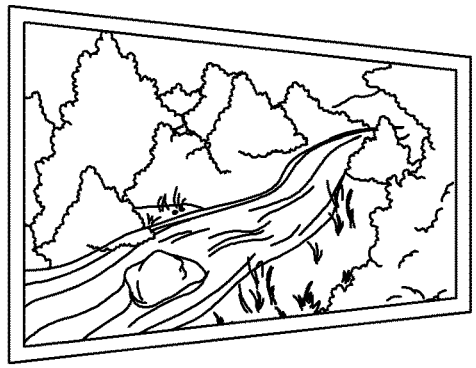
FIGS. 8A and 8B are diagrams illustrating an example method of providing a haptic effect in a large display according to various example embodiments.
Figure 8A:
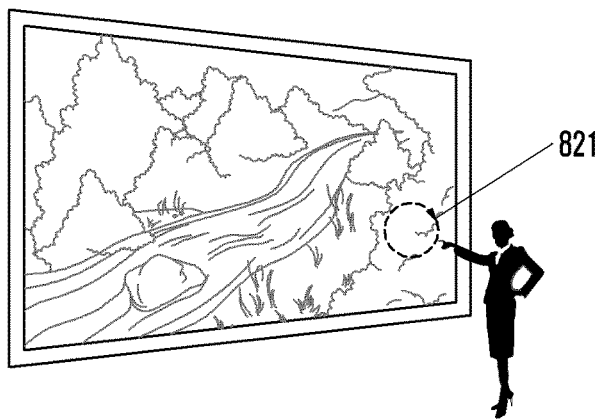
Figure 8A:
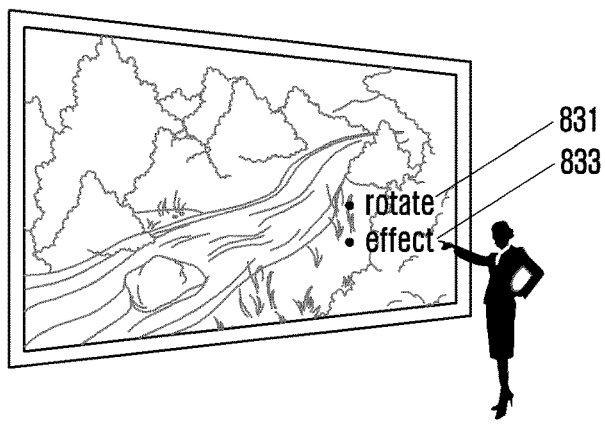
Figure 8B:
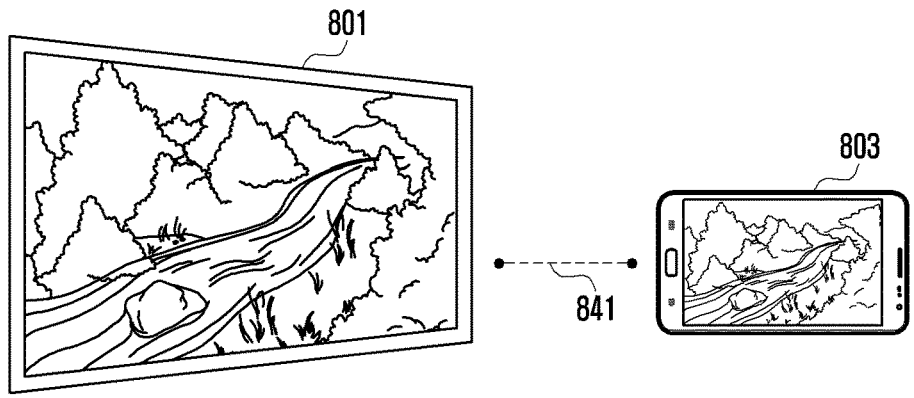
Figure 8B:
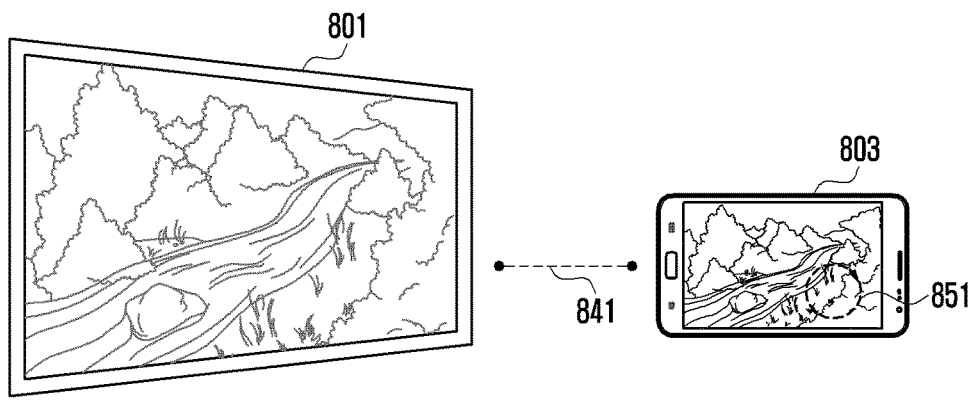
Figure 8B:
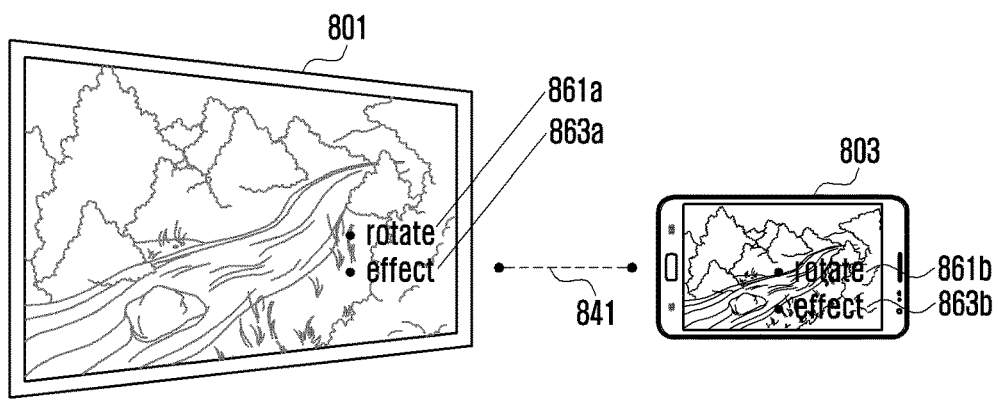

FIGS. 8A and 8B are diagrams illustrating example methods of providing a haptic effect in a large display according to various example embodiments.

Referring to FIG. 8A, as illustrated in 810 of FIG. 8A, in a state in which an image is displayed on the large display, a first input (for example, a circular pattern gesture 821) may be detected as illustrated in 820 of FIG. 8A. The processor (150 of FIG. 1) may output a haptic object or texture corresponding to the circular pattern gesture 821, as illustrated in 830 of FIG. 8A at a location where the circular pattern gesture 821 is detected, in response to the circular pattern gesture 821. For example, the haptic object may include a rotate haptic object 831 for performing a function to rotate an image and an effect haptic object 833 for applying an effect to the image. The rotate haptic object 831 and effect haptic object 833 may be output in different textures. Alternately, in various embodiments, an additional button may be provided close to the rotate haptic object 831 and effect haptic object 833, and the button may be output in a different texture.

In various embodiments, as the electronic device outputs the rotate haptic object 831 and effect haptic object 833 at a location where the circular pattern gesture 821 is detected, the user can directly select the haptic object at a location where the circular pattern gesture 821 is detected, thereby easily performing the function of the haptic object.

In various embodiments, the haptic object may be output differently according to contents displayed on the large display. For example, if the content displayed on the large display is a video play image, the processor (150 of FIG. 1) may output a haptic object for controlling the video play (for example, a video play stop haptic object, and a haptic object for controlling a video play speed) in response to the circular pattern gesture. Alternatively, if the content displayed on the large display is a web image, the processor (150 of FIG. 1) may output a haptic object for controlling the web image (for example, a haptic object to move to previous image, and a screen magnification haptic object) in response to the circular pattern gesture.

In various embodiments, a first electronic device 801 and a second electronic device 803 may be communicatively connected through a communication unit (110 of FIG. 1) 841, and the second electronic device 803 may transmit an input for controlling the first electronic device 801 to the first electronic device 801, and may receive a haptic object or texture corresponding to the input from the first electronic device 801. In various embodiments, it will be described by assuming that the first electronic device 801 may be a large display, and the second electronic is a smart phone. However, it is not limited thereto. In this regard, it will be described later with reference to FIG. 8B.

Referring to FIG. 8B, as illustrated in 840, the first electronic device 801 and the second electronic device 803 are communicatively connected to each other through the communication unit (110 of FIG. 1) 841, and may display the same content images.

In various embodiments, as illustrated in 850 of FIG. 8B, the second electronic device 803 may detect a first input, for example, a circular pattern gesture 851. The second electronic device 803 may transmit a signal of the detected circular pattern gesture 851 and information on a location where the circular pattern gesture 821 is detected to the first electronic device 801 through the communication unit (110 of FIG. 1).

In various embodiments, the first electronic device 801 may determine a haptic object or texture corresponding to the circular pattern gesture 851 in response to the circular pattern gesture 851 received from the second electronic device 803. The first electronic device 801 may transmit the determined haptic object or texture to the second electronic device 803 through the communication unit (110 of FIG. 1). The first electronic device 801 may output the determined haptic object or texture at a location corresponding to the location information received from the second electronic device 803. The second electronic device 803 may output the haptic object or texture received from the first electronic device 801.

For example, as illustrated in 860 of FIG. 8B, the first electronic device 801 may output a rotate haptic object 861a and an effect haptic object 863A. The second electronic device 803 may output the rotate haptic object 861B and effect haptic object 863A received from the first electronic device 801.

Alternatively, in various embodiments, the second electronic device 803 may determine a haptic object or texture corresponding to the circular pattern gesture 851 in response to the circular pattern gesture 851. The second electronic device 803 may transmit the determined haptic object or texture to the first electronic device 801 through the communication unit (110 of FIG. 1). The first electronic device 801 may output the determined haptic object or texture received from the second electronic device 803.

In various embodiments, if a second input for performing a function corresponding to the output haptic object or texture is detected, the second electronic device 803 may transmit a second input signal and location information on a location where the second input is detected to the first electronic device 801 through the communication unit (110 of FIG. 1). The first electronic device 801 may perform the function corresponding to the haptic object or texture corresponding to the location information of the second input in response to the second input received from the second electronic device 803.

Figure 9A:
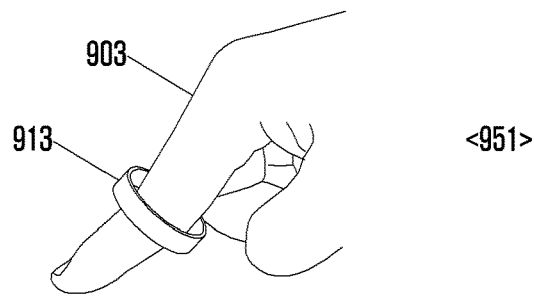
FIGS. 9A and 9B are diagrams illustrating an example method of providing a haptic effect in a ring type electronic device according to various example embodiments.
Figure 9A:
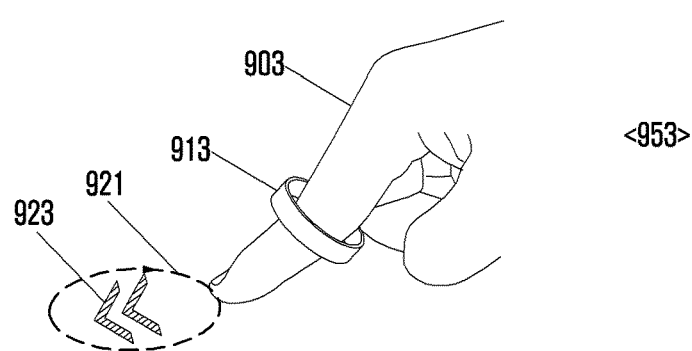
Figure 9A:
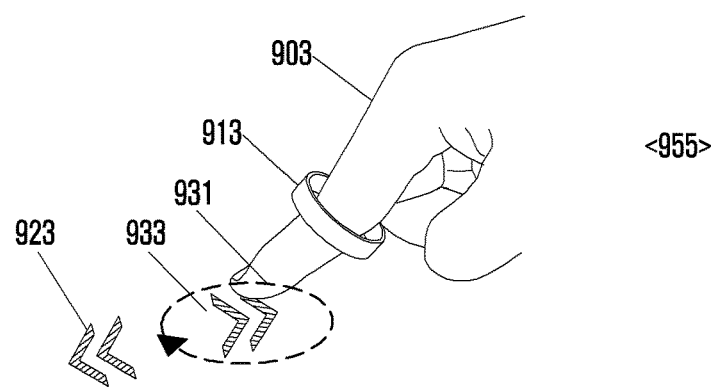
Figure 9A:
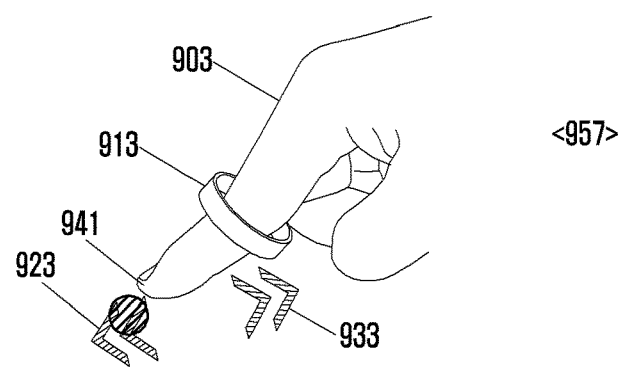
Figure 9B:
Figure 9B:
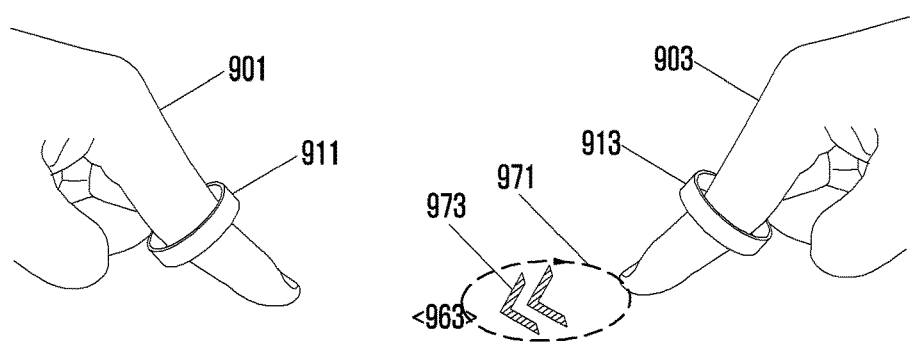
Figure 9B:
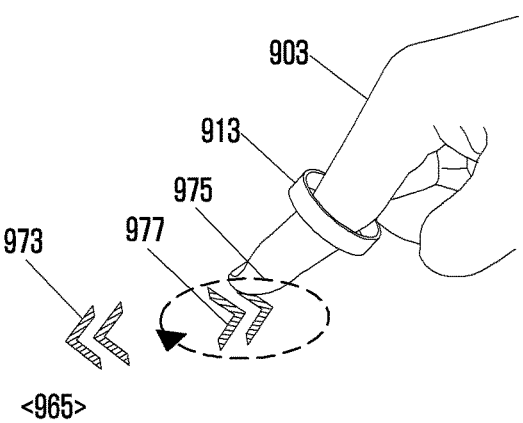
Figure 9B:
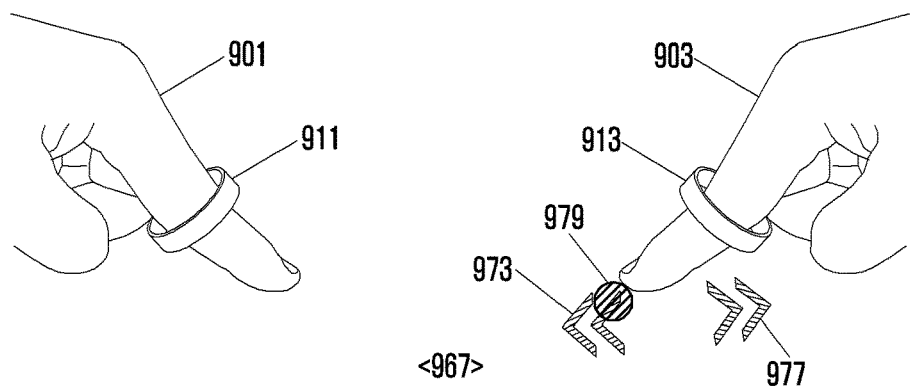

FIGS. 9A and 9B are diagrams illustrating example methods of providing a haptic effect in a ring type electronic device according to various example embodiments o.

In FIGS. 9A and 9B, a haptic object may be generated in space using at least one or more ring type electronic device. FIG. 9A is a view illustrating a method of generating a haptic object in space using one ring type electronic device, and FIG. 9B is a view illustrating a method of generating a haptic object in space using two ring type electronic devices.

Referring to FIG. 9A, in various embodiments, in a state in which a user wears one ring type electronic device, the processor (150 of FIG. 1) may receive a location measurement signal through a GPS and determine a location of a first input detected in space and a haptic object according to the first input. The processor (150 of FIG. 1) may receive the location measurement signal through (for example, a GPS) to measure a location of a second input detected in space, and may perform a function of the haptic object corresponding to the measured location of the second input.

For example, as illustrated in 951 of FIG. 9A, a user may be in a state of wearing the ring type electronic device 913 on a finger 903 of a right hand.

As illustrated in 953 of FIG. 9A, the processor (150 of FIG. 1) may detect a circular pattern gesture 921, for example, a first input. As the circular pattern gesture 921 is detected, the processor (150 of FIG. 1) may output a haptic feedback of a texture 923 hatched from top right to bottom left corresponding to the circular pattern gesture 921.

As illustrated in 955 of FIG. 9A, the processor (150 of FIG. 1) may detect a circular pattern gesture 931, for example, a first input. As the circular pattern gesture 931 is detected, the processor (150 of FIG. 1) may output a haptic feedback of a texture 933 hatched from the top left to the bottom right corresponding to the circular pattern gesture 931.

As illustrated in 957 of FIG. 9A, the processor (150 of FIG. 1) may detect a second input 941 selecting the output haptic object 923 of the texture hatched from the top right to the bottom left. The processor (150 of FIG. 1) may perform a function of the electronic device, which corresponds to the second input 941 selecting the haptic object 923 of the texture hatched from the top right to the bottom left in response to the second input 941 selecting the haptic object 923 of the texture hatched from the top right to the bottom left.

Referring to FIG. 9B, in various embodiments, in a state in which a user wears a plurality of ring type electronic devices, as the plurality of the ring type electronic devices are paired, the processor (150 of FIG. 1) may receive and transmit sensor data detected by a sensor and may determine a location of a first input detected in space and a location of a haptic object according to the first input. The processor (150 of FIG. 1) may measure a location of a second input detected in space through the sensor data, and may perform a function of a haptic object corresponding to the measured location of the second input. In various embodiments, the sensor may include at least one of a motion sensor, a gyro sensor, an acceleration sensor, a GPS module, a muscle movement detection sensor, and a communication wave intensity detection sensor. A user input motion, user input location and user input distance may be detected by the sensor.

For example, as illustrated in 961 of FIG. 9B, the user may be in a state wearing a ring type electronic devices 911, 913 on fingers 901, 903 of the left hand and right hand, respectively. As the user wears ring type electronic devices 911, 913 on fingers 901, 903 of the left hand and right hand, respectively, the ring type electronic devices 911, 913 may be paired with each other, may receive and transmit sensor data detected through the sensor, and may measure locations where a first input and second input are detected.

As illustrated in 963 of FIG. 9B, the processor (150 of FIG. 1) may detect a circular pattern gesture 971, for example, a first input. As the circular pattern gesture 971 is detected, the processor (150 of FIG. 1) may output a haptic feedback of a texture 973 hatched from top right to bottom left corresponding to the circular pattern gesture 971.

As illustrated in 965 of FIG. 9B, the processor (150 of FIG. 1) may detect a circular pattern gesture 975, for example, a first input. As the circular pattern 975 is detected, the processor (150 of FIG. 1) may output a haptic feedback of a texture 977 hatched from the top left to the bottom right corresponding to the circular pattern gesture 975.

As illustrated in 967 of FIG. 9B, the processor (150 of FIG. 9B) may detect an input 979 selecting a haptic object 973 of a texture hatched from top right to bottom left. The processor (150 of FIG. 1) may perform a function of the electronic device, which corresponds to the haptic object 973 of a texture hatched from the top right to the bottom left in response to the input 979 selecting the haptic object 973 of a texture hatched from the top right to the bottom left.

Figure 10:
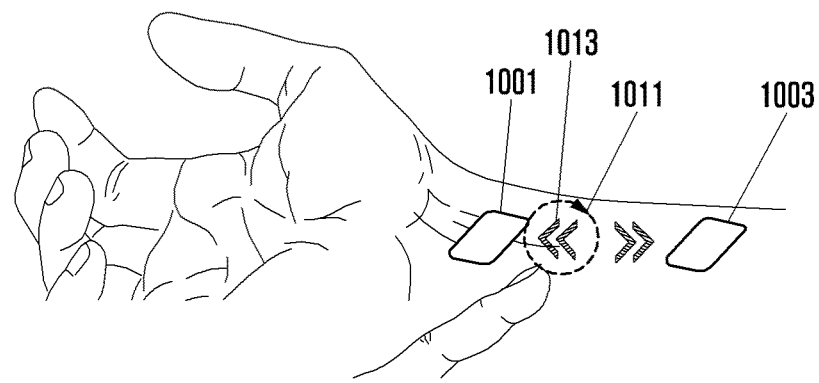
FIG. 10 is a diagram illustrating an example method of providing a haptic effect in a patch type electronic device according to various example embodiments.
Figure 10:
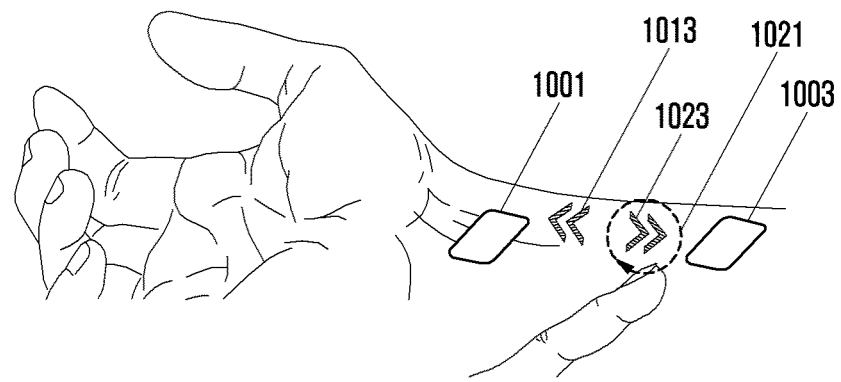
Figure 10:
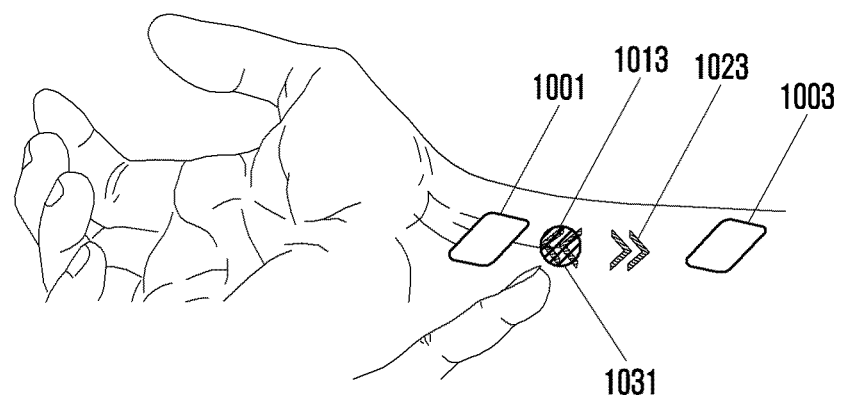

FIG. 10 is a diagram illustrating an example method of providing a haptic effect in a patch type electronic device according to various example embodiments.

In FIG. 10, the patch type electronic device may generate a haptic object in space using one or more patch type electronic device, as the above-described ring type electronic device of FIG. 9. For example, when using one patch type electronic device, the processor (150 of FIG. 1) may receive a location measurement signal through, for example, a GPS and determine a location of a first input detected in space and a haptic object according to the first input. The processor (150 of FIG. 1) may receive the location measurement signal through the GPS to measure a location of a second input detected in space, and may perform a function of the haptic object to corresponding to the measured location of the second input. In case that a plurality of patch type electronic devices are used, as the plurality of the patch type electronic devices are paired, the processor (150 of FIG. 1) may receive and transmit sensor data detected by a sensor and may determine a location of a first input detected in space and a location of a haptic object according to the first input. The processor (150 of FIG. 1) may measure a location of a second input detected in space through the sensor data, and may perform a function of a haptic object corresponding to the measured location of the second input.

Referring to FIG. 10, as illustrated in 1040, a user may be in a state wearing patch type electronic devices 1001, 1003 on a right arm. As the user patches the electronic devices 1001, 1003 on both sides around a region for outputting the haptic object, locations where a gesture for outputting the haptic object and a gesture to request a haptic feedback are detected may be measured. For example, the processor (150 of FIG. 1) may detect a circular pattern gesture 1011 through the patch type electronic devices 1001, 1003. As the circular pattern gesture 1011 is detected, the processor (150 of FIG. 1) may output a haptic feedback of a texture 1013 hatched from the top right to the bottom left corresponding to the circular pattern gesture 1011.

As illustrated in 1050 of FIG. 10, the processor (150 of FIG. 1) may detect a circular pattern gesture 1021. As the circular pattern gesture 1021 is detected, the processor (150 of FIG. 1) may output a haptic feedback of a texture 1023 hatched from the top left to the bottom right corresponding to the circular pattern gesture 1021.

As illustrated in 1060 of FIG. 10, the processor (150 of FIG. 1) may detect an input 1031 selecting a haptic object 1013 of a texture hatched from top right to bottom left. The processor (150 of FIG. 1) may perform a function of the electronic device which corresponds to the haptic object 923 of the texture hatched from the top right to the bottom left in response to the input 1031 selecting the haptic object 1013 of the texture hatched from top right to bottom left.

Figure 11:
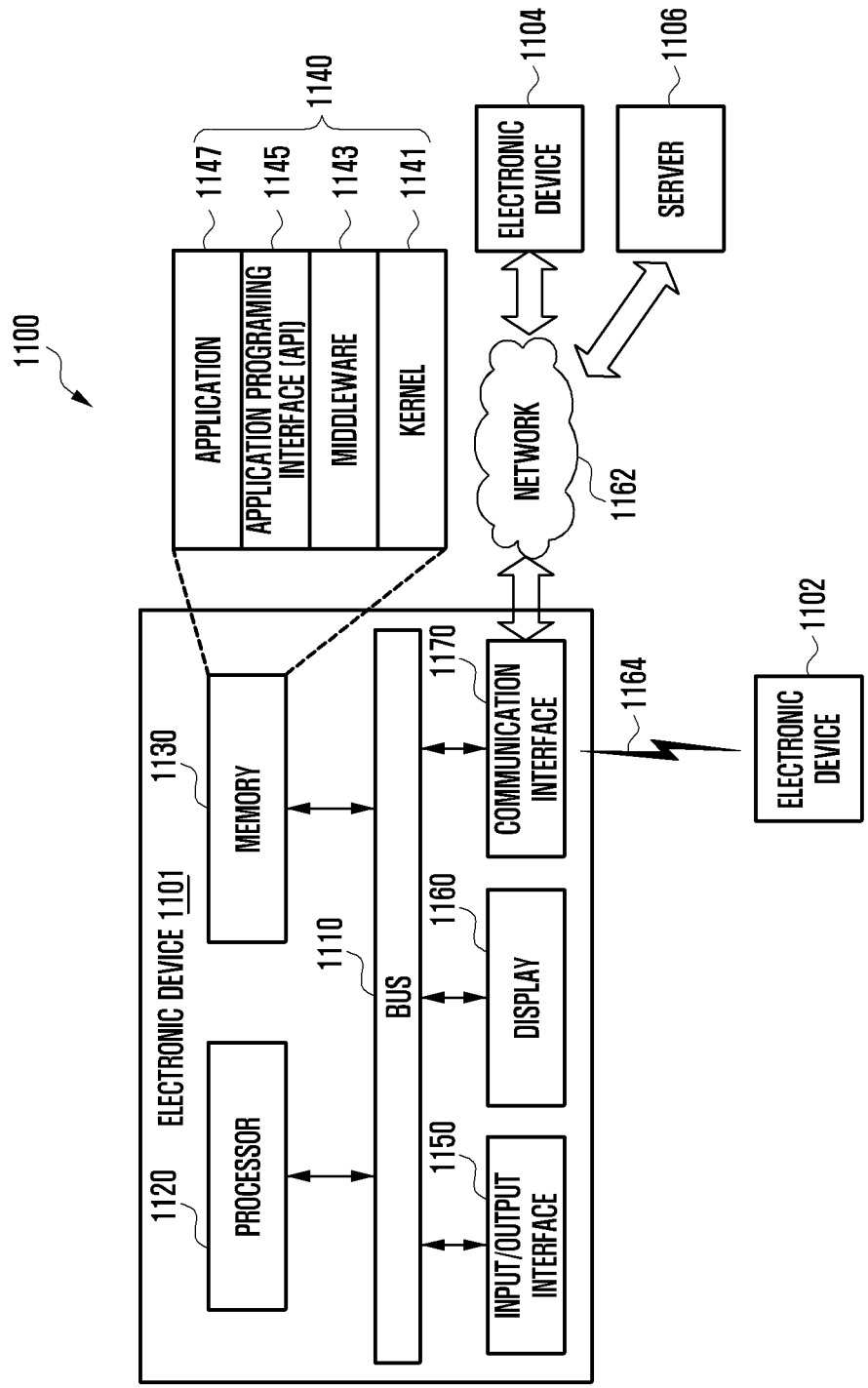
FIG. 11 is a block diagram illustrating an example network environment according to various example embodiments.

FIG. 11 illustrates an example network environment including electronic devices according to various example embodiments.

Referring to FIG. 11, an electronic device 1101, in a network environment 1100, includes a bus 1110, a processor 1120 (e.g., the processor 150), a memory 1130 (e.g., the storage unit 120), an input/output interface (e.g., including input/output circuitry 1150, a display 1160 (e.g., the touch screen 130), and a communication interface (e.g., including communication circuitry) 1170 (e.g., the communication unit 110). According to some embodiment, the electronic device 1101 may omit at least one of the components or further include another component.

The bus 1110 may be a circuit connecting the above described components and transmitting communication (e.g., a control message) between the above described components.

The processor 1120 may include one or more of central processing unit (CPU), application processor (AP) or communication processor (CP). For example, the processor 1120 may control at least one component of the electronic device 1101 and/or execute calculation relating to communication or data processing.

The memory 1130 (e.g., the storage unit 120) may include volatile and/or non-volatile memory. For example, the memory 1130 may store command or data relating to at least one component of the electronic device 1101. According to some embodiment, the memory may store software and/or program 1140. For example, the program 1140 may include a kernel 1141, middleware 1143, an application programming interface (API) 1145, and/or an application 1147 and so on. At least one portion of the kernel 1141, the middleware 1143 and the API 1145 may be defined as operating system (OS).

The kernel 1141 controls or manages system resources (e.g., the bus 1110, the processor 1120, or the memory 1130) used for executing an operation or function implemented by the remaining other program, for example, the middleware 143, the API 1145, or the application 1147. Further, the kernel 1141 provides an interface for accessing individual components of the electronic device 1101 from the middleware 1143, the API 1145, or the application 1147 to control or manage the components.

The middleware 1143 performs a relay function of allowing the API 1145 or the application 1147 to communicate with the kernel 1141 to exchange data. Further, in operation requests received from the application 1147, the middleware 1143 performs a control for the operation requests (e.g., scheduling or load balancing) by using a method of assigning a priority, by which system resources (e.g., the bus 1110, the processor 1120, the memory 1130 and the like) of the electronic device 1101 may be used, to the application 1147. The API 1145 is an interface by which the application 1147 may control a function provided by the kernel 1141 or the middleware 1143 and includes, for example, at least one interface or function (e.g., command) for a file control, a window control, image processing, or a character control.

The input/output interface 1150 may include various input/output circuitry configured to provide an interface to transmit command or data input by a user or another external device to another component(s) of the electronic device 1101. Further, the input/output interface 1150 may output the command or data received from the another component(s) of the electronic device 1101 to the user or the another external device.

The display 1160 (e.g., the touch screen 130) may include, for example, liquid crystal display (LCD), light emitting diode (LED), organic LED (OLED), or micro electro mechanical system (MEMS) display, or electronic paper display. The display 1160 may display, for example, various contents (text, image, video, icon, or symbol, and so on) to a user. The display 1160 may include a touch screen, and receive touch, gesture, approaching, or hovering input using a part of body of the user.

The communication interface 1170 (e.g., the communication unit 110) may include various communication circuitry configured to set communication of the electronic device 1101 and external device (e.g., a first external device 1102, a second external device 1104, or a server 1106). For example, the communication interface 1170 may be connected with the network 1162 through wireless communication or wire communication and communicate with the external device 1164 (e.g., a second external device 104 or server 1106).

Wireless communication may use, as cellular communication protocol, at least one of LTE (long-term evolution), LTE-A (LTE Advance), CDMA (code division multiple access), WCDMA (wideband CDMA), UMTS (universal mobile telecommunications system), WiBro (Wireless Broadband), GSM (Global System for Mobile Communications), and the like, for example. A short-range communication 164 may include, for example, at least one of Wi-Fi, Bluetooth, Near Field Communication (NFC), Magnetic Secure Transmission or near field Magnetic data Stripe Transmission (MST), and Global Navigation Satellite System (GNSS), and the like. The GNSS may include at least one of, for example, a Global Positioning System (GPS), a Global navigation satellite system (Glonass), a Beidou Navigation Satellite System (hereinafter, referred to as "Beidou"), and Galileo (European global satellite-based navigation system). Hereinafter, the "GPS" may be interchangeably used with the "GNSS" in the disclosure. Wired communication may include, for example, at least one of USB (universal serial bus), HDMI (high definition multimedia interface), RS-232 (recommended standard-232), POTS (plain old telephone service), and the like. The network 162 may include telecommunication network, for example, at least one of a computer network (e.g., LAN or WAN), internet, and a telephone network.

Each of the first external device 1102 and the second external device 1104 may be same type or different type of device with the electronic device 1101. According to some embodiment, the server 1106 may include one or more group of servers. According to various embodiment, at least one portion of executions executed by the electronic device may be performed by one or more electronic devices (e.g., external electronic device 1102, 1104, or server 1106). According to some embodiments, when the electronic device 1101 should perform a function or service automatically, the electronic device 1101 may request performing of at least one function to the another device (e.g., external electronic device 1102, 1104, or server 1106). For the above, cloud computing technology, distributed computing technology, or client-server computing technology may be used, for example.

Figure 12:
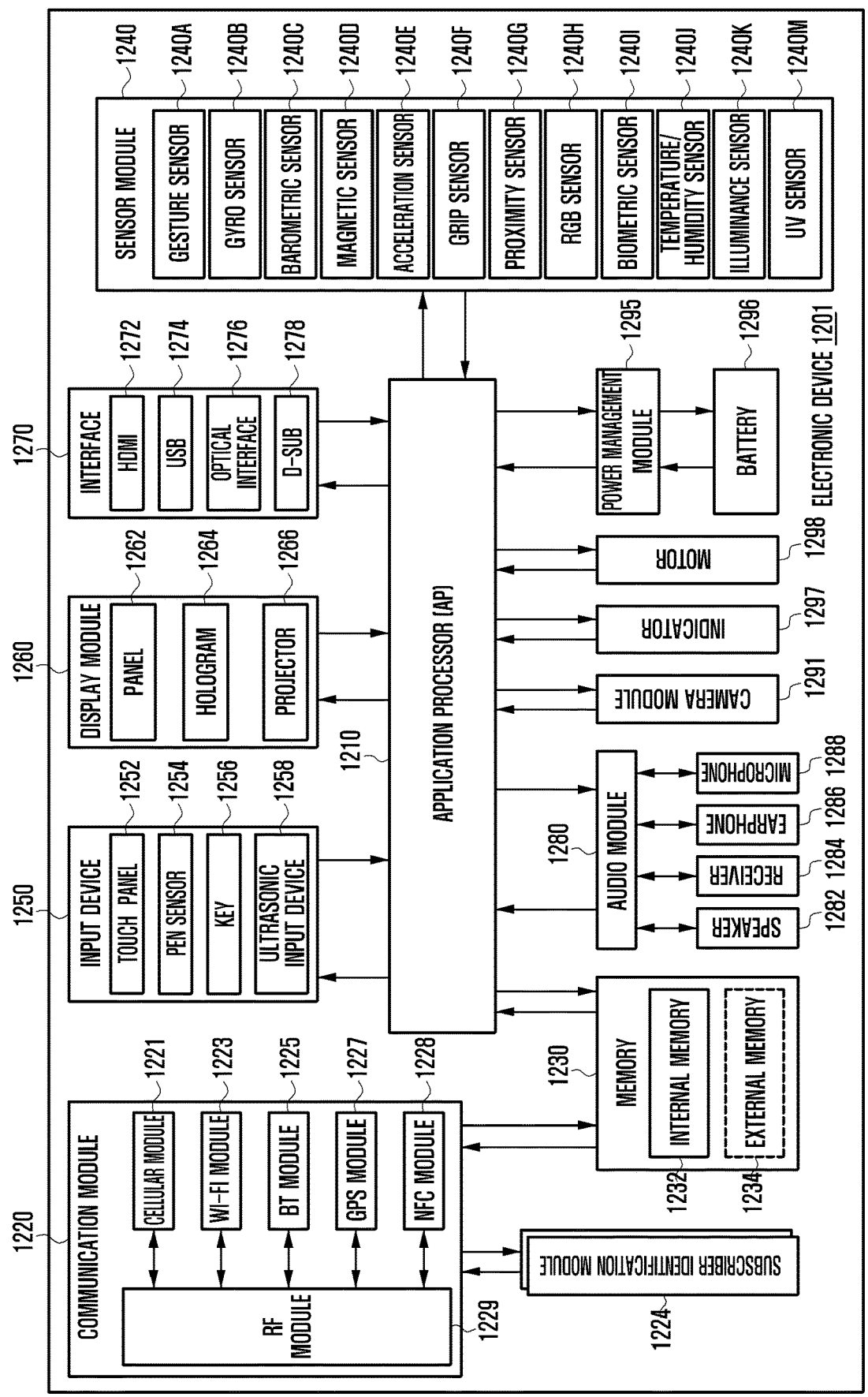
FIG. 12 is a block diagram illustrating an example electronic device according to various example embodiments.

FIG. 12 is a block diagram illustrating an example electronic device according to various embodiments.

Referring to FIG. 12, an electronic device 1201 may include, for example, a whole or a part of the electronic device 1101 illustrated in FIG. 11. An electronic device 1201 may include, for example, a whole or a part of the electronic device illustrated in FIG. 1. The electronic device 1201 includes one or more APs 1210, a communication module (e.g., including communication circuitry) 1220, a subscriber identification module (SIM) card 1224, a memory 1230, a sensor module 1240, an input device (e.g., including input circuitry) 1250, a display 1260, an interface (e.g., including interface circuitry) 1270, an audio module 1280, a camera module 1291, a power managing module 1295, a battery 1296, an indicator 1297, and a motor 1298.

The AP 1210 operates an OS or an application program so as to control a plurality of hardware or software component elements connected to the AP 1210 and execute various data processing and calculations including multimedia data. The AP 1210 may be implemented by, for example, a system on chip (SoC). According to an embodiment, the processor 1210 may further include a graphics processing unit (GPU) and/or image signal processor. The AP 1210 may include at least one portion of components illustrated in FIG. 12 (e.g., a cellular module 1221). The AP 1210 may load command or data received from at least one of another component (e.g., non-volatile memory), store various data in the non-volatile memory.

The communication module 1220 may include various communication circuitry and may include the same or similar components with the communication interface 1170 of FIG. 11 (or the communication unit 110 of FIG. 1). The communication module 1220, for, example, may include various communication circuitry, such as, for example, and without limitation, the cellular module 1221, a Wi-Fi module 1223, a BT module 1225, a GPS module 1227, a NFC module 1228, and a radio frequency (RF) module 1229.

The cellular module 1221 provides a voice, a call, a video call, a short message service (SMS), or an internet service through a communication network (e.g., LTE, LTE-A, CDMA, WCDMA, UMTS, WiBro, GSM and the like). Further, the cellular module 1221 may distinguish and authenticate electronic devices within a communication network by using a SIM (e.g., the SIM card 1224). According to an embodiment, the cellular module 1221 performs at least some of the functions which may be provided by the AP 1210. For example, the cellular module 1221 may perform at least some of the multimedia control functions. According to an embodiment, the cellular module 1221 may include a CP.

Each of the Wi-Fi module 1223, the BT module 1225, the GPS module 1227, and the NFC module 1228 may include, for example, a processor for processing data transmitted/received through the corresponding module.

Although the cellular module 1221, the Wi-Fi module 1223, the BT module 1225, the GPS module 1227, and the NFC module 1228 are at least some (e.g., two or more) of the cellular module 1221, the Wi-Fi module 1223, the BT module 1225, the GPS module 1227, and the NFC module 1228 may be included in one integrated chip (IC) or one IC package according to one embodiment. For example, at least some (e.g., the CP corresponding to the cellular module 1221 and the Wi-Fi processor corresponding to the Wi-Fi module 1223) of the processors corresponding to the cellular module 1221, the Wi-Fi module 1223, the BT module 1225, the GPS module 1227, and the NFC module 1228 may be implemented by one SoC.

The RF module 1229 transmits/receives data, for example, an RF signal. Although not illustrated, the RF module 1229 may include, for example, a transceiver, a power amp module (PAM), a frequency filter, a low noise amplifier (LNA) and the like. Further, the RF module 1229 may further include a component for transmitting/receiving electronic waves over a free air space in wireless communication, for example, a conductor, a conducting wire, and the like.

Although the cellular module 1221, the Wi-Fi module 1223, the BT module 1225, the GPS module 1227, and the NFC module 1228 share one RF module 1229 in FIG. 12, at least one of the cellular module 1221, the Wi-Fi module 1223, the BT module 1225, the GPS module 1227, and the NFC module 1228 may transmit/receive an RF signal through a separate RF module according to one embodiment.

The SIM card 1224 is a card including a SIM and may be inserted into a slot formed in a particular portion of the electronic device. The SIM card 1224 includes unique identification information (e.g., integrated circuit card identifier (ICCID)) or subscriber information (e.g., international mobile subscriber identity (IMSI)).

The memory 1230 (e.g., memory 1130, storage unit 120) may include an internal memory 1232 or an external memory 1234. The internal memory 1232 may include, for example, at least one of a volatile memory (e.g., a random access memory (RAM), a dynamic RAM (DRAM), a static RAM (SRAM), a synchronous dynamic RAM (SDRAM), and the like), and a non-volatile Memory (e.g., a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, and the like).

According to an embodiment, the internal memory 1232 may be a solid state drive (SSD). The external memory 1234 may further include a flash drive, for example, a compact flash (CF), a secure digital (SD), a micro-SD, a mini-SD, an extreme digital (xD), or a memory stick. The external memory 1234 may be functionally connected to the electronic device 1201 through various interfaces. According to an embodiment, the electronic device 1201 may further include a storage device (or storage medium) such as a hard drive.

The sensor module 1240 measures a physical quantity or detects an operation state of the electronic device 1201, and converts the measured or detected information to an electronic signal. The sensor module 1240 may include, for example, at least one of a gesture sensor 1240A, a gyro sensor 1240B, an atmospheric pressure (barometric) sensor 1240C, a magnetic sensor 1240D, an acceleration sensor 1240E, a grip sensor 1240F, a proximity sensor 1240G, a color sensor 1240H (e.g., red, green, and blue (RGB) sensor) 1240H, a biometric sensor 1240I, a temperature/humidity sensor 1240J, an illuminance (light) sensor 240K, and a ultraviolet (UV) sensor 1240M. Additionally or alternatively, the sensor module 1240 may include, for example, an E-nose sensor, an electromyography (EMG) sensor, an electroencephalogram (EEG) sensor, an electrocardiogram (ECG) sensor, an infrared (IR) sensor, an iris sensor, a fingerprint sensor (not illustrated), and the like. The sensor module 1240 may further include a control circuit for controlling one or more sensors included in the sensor module 1240. In embodiments, the electronic device 1201 is capable of including a processor, configured as part of the processor 1210 or a separate component, for controlling the sensor module 1240. In this case, while the processor 1210 is operating in sleep mode, the processor is capable of controlling the sensor module 1240.

The input device 1250 includes various input circuitry, such as, for example, and without limitation, a touch panel 1252 (e.g., the touch panel 132), a (digital) pen sensor 1254, a key 1256, and an ultrasonic input device 1258. For example, the touch panel 1252 may recognize a touch input in at least one type of a capacitive type, a resistive type, an infrared type, and an acoustic wave type. The touch panel 1252 may further include a control circuit. In the capacitive type, the touch panel 1252 may recognize proximity as well as a direct touch. The touch panel 1252 may further include a tactile layer. In this event, the touch panel 1252 provides a tactile reaction to the user.

The (digital) pen sensor 1254 may be implemented, for example, using a method identical or similar to a method of receiving a touch input of the user, or using a separate recognition sheet. The key 1256 may include, for example, a physical button, an optical key, or a key pad. The ultrasonic input device 1258 is a device which may detect an acoustic wave by a microphone (e.g., a microphone 1288) of the electronic device 1201 through an input means generating an ultrasonic signal to identify data and may perform wireless recognition.

The display 1260 (e.g., display 1160, touch screen 130) includes a panel 1262, a hologram device 1264, and a projector 1266. The panel 1262 may be, for example, a LCD or an active matrix OLED (AM-OLED). The panel 1262 may be implemented to be, for example, flexible, transparent, or wearable. The panel 1262 may be configured by the touch panel 1252 and one module. The hologram device 1264 shows a stereoscopic image in the air by using interference of light. The projector 1266 projects light on a screen to display an image. For example, the screen may be located inside or outside the electronic device 1201. According to an embodiment, the display 1260 may further include a control circuit for controlling the panel 1262, the hologram device 1264, and the projector 1266.

The interface 1270 includes various interface circuitry, such as, for example, and without limitation, a HDMI 1272, an USB 1274, an optical interface 1276, and a D-subminiature (D-sub) 1278. The interface 1270 may be included in, for example, the communication interface 1170 illustrated in FIG. 11. Additionally or alternatively, the interface 1270 may include, for example, a mobile high-definition link (MHL) interface, an SD card/multi-media card (MMC), or an infrared data association (IrDA) standard interface.

The audio module 1280 bi-directionally converts a sound and an electronic signal. At least some components of the audio module 1280 may be included in, for example, the input/output interface 1150 illustrated in FIG. 11. The audio module 1280 processes sound information input or output through, for example, a speaker 1282, a receiver 1284, an earphone 1286, the microphone 1288 and the like.

The camera module 1291 is a device which may photograph a still image and a video. According to an embodiment, the camera module 1291 to may include one or more image sensors (e.g., a front sensor or a back sensor), an image signal processor (ISP) (not shown) or a flash (e.g., an LED or xenon lamp).

The power managing module 1295 manages power of the electronic device 1201. Although not illustrated, the power managing module 1295 may include, for example, a power management integrated circuit (PMIC), a charger IC, or a battery or fuel gauge.

The PMIC may be mounted to, for example, an integrated circuit or a SoC semiconductor. A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier and the like may be added.

The battery fuel gauge measures, for example, a remaining quantity of the battery 1296, or a voltage, a current, or a temperature during charging. The battery 1296 may store or generate electricity and supply power to the electronic device 1201 by using the stored or generated electricity. The battery 296 may include a rechargeable battery or a solar battery.

The indicator 1297 shows particular statuses of the electronic device 1201 or a part (e.g., AP 1210, processor 150) of the electronic device 1201, for example, a booting status, a message status, a charging status and the like. The motor 1298 converts an electrical signal to a mechanical vibration. Although not illustrated, the electronic device 1201 may include a processing unit (e.g., GPU) for supporting a module TV. The processing unit for supporting the mobile TV may process, for example, media data according to a standard of digital multimedia broadcasting (DMB), digital video broadcasting (DVB), media flow and the like.

Each of the components of the electronic device according to various embodiments may be implemented by one or more components and the name of the corresponding component may vary depending on a type of the electronic device. The electronic device according to various embodiments may include at least one of the above described components, a few of the components may be omitted, or additional components may be further included. Also, some of the components of the electronic device according to various embodiments may be combined to form a single entity, and thus may equivalently execute functions of the corresponding components before being combined.

Figure 13:
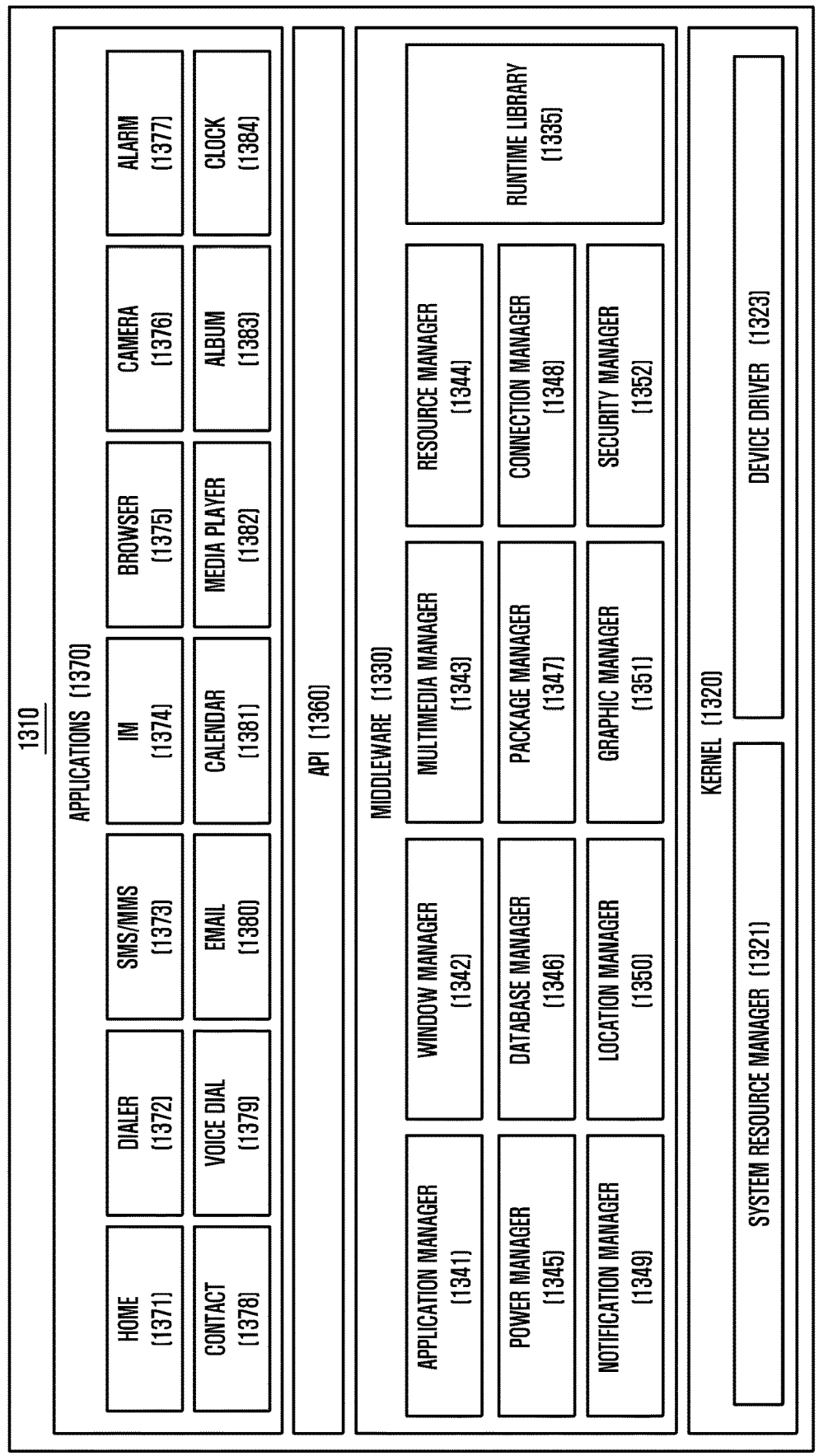
FIG. 13 is a block diagram illustrating an example program module according to various example embodiments

FIG. 13 is a block diagram illustrating an example programming module according to various embodiments.

Referring to FIG. 13, a programming module 1310 may be included, e.g. stored, in the electronic apparatus 1100, e.g. the memory 1130, as illustrated in FIG. 11. At least a part of the programming module 1310 (e.g., program 1140) may be realized by software, firmware, hardware, and/or combinations of two or more thereof. The programming module 1310 may include an OS that is implemented in hardware, e.g., the hardware 1200 to control resources related to an electronic device, e.g., the electronic device 1100, and/or various applications. e.g., applications 1370, driven on the OS. For example, the OS may be Android, iOS, Windows, Symbian, Tizen, Bada, and the like.

Referring to FIG. 13, the programming module 1310 may include a kernel 1320, middleware 1330, an API 1360, and the applications 1370 (e.g., application 1147). At least part of the program module 1310 may be preloaded on the electronic device or downloaded from a server (e.g., an electronic device 1102, 1104, server 1106, etc.).

The kernel 1320, which may be like the kernel 1141, may include a system resource manager 1321 and/or a device driver 1323. The system resource manager 1321 may include, for example, a process manager, a memory manager, and a file system manager. The system resource manager 1321 may control, allocate, and/or collect system resources. The device driver 1323 may include, for example, a display driver, a camera driver, a BT driver, a shared memory driver, a USB driver, a keypad driver, a Wi-Fi driver, and an audio driver. Further, according to an embodiment, the device driver 1323 may include an inter-process communication (IPC) driver (not illustrated).

The middleware 1330 may include a plurality of modules implemented in advance for providing functions commonly used by the applications 1370. Further, the middleware 1330 may provide the functions through the API 1360 such that the applications 1370 may efficiently use restricted system resources within the electronic apparatus. For example, as illustrated in FIG. 13, the middleware 1330 may include at least one of a runtime library 1335, an application manager 1341, a window manager 1342, a multimedia manager 1343, a resource manager 1344, a power manager 1345, a database manager 1346, a package manager 1347, a connectivity (connection) manager 1348, a notification manager 1349, a location manager 1350, a graphic manager 1351, and a security manager 1352.

The runtime library 1335 may include a library module that a compiler uses in order to add a new function through a programming language while one of the applications 1370 is being executed. According to an embodiment, the runtime library 1335 may perform an input/output, memory management, and/or a function for an arithmetic function.

The application manager 1341 may manage a life cycle of at least one of the applications 1370. The window manager 1342 may manage graphical user interface (GUI) resources used by a screen. The multimedia manager 1343 may detect formats used for reproduction of various media files, and may perform encoding and/or decoding of a media file by using a codec suitable for the corresponding format. The resource manager 1344 may manage resources such as a source code, a memory, and a storage space of at least one of the applications 1370.

The power manager 1345 may manage a battery and/or power, while operating together with a basic input/output system (BIOS), and may provide power information used for operation. The database manager 1346 may manage generation, search, and/or change of a database to be used by at least one of the applications 1370. The package manager 1347 may manage installation and/or an update of an application distributed in a form of a package file.

For example, the connectivity manager 1348 may manage wireless connectivity such as Wi-Fi or BT. The notification manager 1349 may display and/or notify of an event, such as an arrival message, a promise, a proximity notification, and the like, in such a way that does not disturb a user. The location manager 1350 may manage location information of an electronic apparatus. The graphic manager 1351 may manage a graphic effect which will be provided to a user, and/or a user interface related to the graphic effect. The security manager 1352 may provide all security functions used for system security and/or user authentication. According to an embodiment, when an electronic apparatus, e.g., the electronic apparatus 1100, has a telephone call function, the middleware 1330 may further include a telephony manager (not illustrated) for managing a voice and/or video communication function of the electronic apparatus.

The middleware 1330 may generate and use a new middleware module through various functional combinations of the aforementioned internal element modules. The middleware 1330 may provide modules specialized according to types of OSs in order to provide differentiated functions. Further, the middleware 1330 may dynamically remove some of the existing elements and/or add new elements. Accordingly, the middleware 1330 may exclude some of the elements described in the various embodiments, further include other elements, and/or substitute the elements with elements having a different name and performing a similar function.

The API 1360, which may be similar to the API 1145, is a set of API programming functions, and may be provided with a different configuration according to the OS. For example, in a case of Android or iOS, one API set may be provided for each of platforms, and in a case of Tizen, two or more API sets may be provided.

The applications 1370 (e.g., application programs 1147) may include one or more applications for performing various functions, e.g., home 1371, dialer 1372, SMS/MMS 1373, instant message (IM) 1374, browser 1375, camera 1376, alarm 1377, contact 1378, voice dial 1379, email 1380, calendar 1381, media player 1382, album 1383, clock 1384, health care (e.g., an application for measuring amount of exercise, blood sugar level, etc.), and environment information (e.g., an application for providing atmospheric pressure, humidity, temperature, etc.), not shown.

According to an embodiment, the applications 1370 are capable of including an application for supporting information exchange between an electronic device (e.g., electronic device 1101) and an external device (e.g., electronic devices 1102 and 1104), which is hereafter called 'information exchange application'). The information exchange application is capable of including a notification relay application for relaying specific information to external devices or a device management application for managing external devices.

For example, the notification relay application is capable of including a function for relaying notification information, created in other applications of the electronic device (e.g., SMS/MMS application, email application, health care application, environment information application, etc.) to external devices (e.g., electronic devices 1102 and 1104). In addition, the notification relay application is capable of receiving notification information from external devices to provide the received information to the user.

The device management application is capable of managing (e.g., installing, removing or updating) at least one function of an external device (e.g., electronic devices 1102 and 1104) communicating with the electronic to device. Examples of the function are a function of turning-on/off the external device or part of the external device, a function of controlling the brightness (or resolution) of the display, applications running on the external device, services provided by the external device, etc. Examples of the services are a call service, messaging service, etc.

According to an embodiment, the applications 1370 are capable of including an application (e.g., a health care application of a mobile medical device, etc.) specified attributes of an external device (e.g., electronic devices 1102 and 1104). According to an embodiment, the applications 1370 are capable of including applications received from an external device (e.g., a server 1106, electronic devices 1102 and 1104). According to an embodiment, the applications 1370 are capable of including a preloaded application or third party applications that can be downloaded from a server. It should be understood that the components of the program module 1310 may be called different names according to types of operating systems.

According to various embodiments, at least part of the program module 1310 can be implemented with software, firmware, hardware, or any combination of two or more of them. At least part of the program module 1310 can be implemented (e.g., executed) by a processor (e.g., processor 1210). At least part of the programming module 1310 may include modules, programs, routines, sets of instructions or processes, etc., in order to perform one or more functions.

The term "module" used in the disclosure may refer to, for example, a unit including at least one combination of hardware (e.g., circuitry), software, and firmware. The "module" may be interchangeably used with a term, such to as unit, logic, logical block, component, and/or circuit. The "module" may be a minimum unit of an integrally configured article and/or a part thereof. The "module" may be a minimum unit performing at least one function and/or a part thereof. The "module" may be mechanically and/or electronically implemented. For example, the "module" according to the disclosure may include at least one of processing circuitry (e.g., a CPU), an application-specific IC (ASIC) chip, a field-programmable gate arrays (FPGA), and a programmable-logic device for performing operations which has been known and/or are to be developed.

According to various embodiments, at least some of the devices (e.g., modules or functions thereof) or the method (e.g., operations) according to the disclosure may be implemented by a command stored in a computer-readable storage medium in a programming module form. When the instructions are executed by at least one processor (e.g., the processor 1120), the at least one processor may perform functions corresponding to the instructions. The computer-readable storage medium may be, for example, the memory 1130. At least a part of the programming module may be implemented (e.g., executed) by, for example, the processor 1120. At least some of the programming modules may include, for example, a module, a program, a routine, a set of instructions or a process for performing one or more functions.

The computer-readable recording medium may include magnetic media such as a hard disk, a floppy disk, and a magnetic tape, optical media such as a compact disc ROM (CD-ROM) and a DVD, magneto-optical media such as a floptical disk, and hardware devices specially configured to store and perform a program instruction (e.g., programming module), such as a ROM, a RAM, a to flash memory and the like. In addition, the program instructions may include high class language codes, which may be executed in a computer by using an interpreter, as well as machine codes made by a compiler. The aforementioned hardware device may be configured to operate as one or more software modules in order to perform the operation of the disclosure, and vice versa.

The module or programming module of the disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

Although the method of providing a haptic effect and a device supporting the same according to various embodiments have been described, the scope of the disclosure is not limited thereto, and various changes and modifications can be made without departing from the essential features of the disclosure by those skilled in the art. Accordingly, the embodiments disclosed are only for describing, but not limiting, the technical idea of the disclosure, and the scope of the technical idea of the disclosure is not limited by the embodiments. The scope of the disclosure should be construed by the appended claims, and all technical ideas within a range equivalent to the scope should be construed as being included in the scope of the disclosure.

What is claimed is:

1. An electronic device comprising:
    a touch panel;
    a haptic module including haptic circuitry; and
    a processor configured to:
        determine, in response to detecting a gesture at a specific location of the touch panel, a function of the electronic device and a texture corresponding to a distance moved from the specific location where the gesture is detected,
        generate a haptic object corresponding to the determined function of the electronic device at the specific location where the gesture is detected and control the haptic circuitry to output a haptic feedback to which the determined texture is applied to the generated haptic object, and
        perform, in response to a user input for selecting the haptic object with the texture applied, a control of the function of the electronic device corresponding to the selected haptic object.

2. The electronic device of claim 1, wherein the processor is configured to:
    identify, in response to detecting the user input, the function control corresponding to the selected haptic object.

3. The electronic device of claim 1, wherein:
    a plurality of haptic modules are provided in the electronic device, and
    the processor is configured to control the output of the haptic feedback based on the determined texture through at least one haptic module from among the plurality of haptic modules.

4. The electronic device of claim 1, further comprising communication circuitry,
    wherein the processor is configured to:
    if a gesture from an external device communicatively connected through the communication circuitry is received, control the output of the haptic feedback based on the gesture received from the external device, and
    if a user input from the external device is received, perform control of a function corresponding to a generated haptic object based on the user input received from the external device.

5. The electronic device of claim 4, further comprising a sensor unit including at least one sensor,
    wherein the processor is configured to receive and transmit sensor data including location information of the gesture or user input detected through the at least one sensor, from and to the external device through the communication circuitry.

6. The electronic device of claim 1, wherein the processor is configured to detect an input for activating haptic feedback through the touch panel.

7. The electronic device of claim 6, wherein the input for activating the haptic feedback is detected before the gesture is detected.

8. The electronic device of claim 7, wherein
    the processor is configured to detect the user input after the input for activating the haptic feedback is detected.

9. The electronic device of claim 1, wherein the function of the electronic device comprises at least one of an audio play control function, an approval function, file transmission and reception functions, a display on or off function of the electronic device, a function to change into an idle mode, a function to change into a sleep mode, and a power on or off function.

10. The electronic device of claim 1, further comprising a display,
    wherein the processor is configured to control the display to display the texture that is applied to the haptic object.

11. A method of providing a haptic feedback, the method comprising:
    detecting a gesture at a specific location of a touch panel;
    determining, in response to detecting the gesture, a function of an electronic device and a texture corresponding to a distance moved from the specific location where the gesture is detected;
    generating a haptic object corresponding to the determined function of the electronic device at the specific location where the gesture is detected and outputting a haptic feedback to which the determined texture is applied to the generated haptic object; and
    performing, in response to a user input for selecting the haptic object with the texture applied, a control of the function of the electronic device corresponding to the selected haptic object.

12. The method of claim 11, further comprising:
    identifying, in response to detecting the user input, the function control corresponding to the selected haptic object.

13. The method of claim 11, wherein the texture comprises roughness, unevenness, and smoothness.

14. The method of claim 13, wherein the outputting of the haptic feedback comprises outputting the haptic feedback based on the texture through haptic circuitry of at least one haptic module.

15. The method of claim 11, further comprising detecting an input for activating haptic feedback.

16. The method of claim 15, wherein the input for activating the haptic feedback is detected before the gesture is detected.

17. The method of claim 16, further comprising detecting the user input after the input for activating the haptic feedback is detected.

18. The method of claim 11, wherein the function of the electronic device comprises at least one of an audio play control function, an approval function, file transmission and reception functions, a display on or off function of the electronic device, a function to change into an idle mode, a function to change into a sleep mode, and a power on or off function.

* * * * *